United States Patent
Harper

(10) Patent No.: US 8,676,046 B2
(45) Date of Patent: Mar. 18, 2014

(54) FINGERPRINT SCANNING SYSTEMS AND METHODS

(71) Applicant: Jack Harper, Evergreen, CO (US)

(72) Inventor: Jack Harper, Evergreen, CO (US)

(*) Notice: Subject to any disclaimer, the term of this patent is extended or adjusted under 35 U.S.C. 154(b) by 0 days.

(21) Appl. No.: 13/685,841

(22) Filed: Nov. 27, 2012

(65) Prior Publication Data

US 2013/0301832 A1 Nov. 14, 2013

Related U.S. Application Data

(62) Division of application No. 12/580,072, filed on Oct. 15, 2009, now Pat. No. 8,331,775.

(51) Int. Cl.
*G03B 29/00* (2006.01)

(52) U.S. Cl.
USPC .................................................. 396/15

(58) Field of Classification Search
USPC .................................................. 396/15
See application file for complete search history.

(56) References Cited

U.S. PATENT DOCUMENTS

| 8,331,775 B2 * | 12/2012 | Harper | 396/15 |
| 2005/0033695 A1 * | 2/2005 | Minowa | 705/45 |
| 2006/0174134 A1 * | 8/2006 | Taylor | 713/186 |
| 2011/0090541 A1 * | 4/2011 | Harper | 358/474 |

* cited by examiner

*Primary Examiner* — William B Perkey
(74) *Attorney, Agent, or Firm* — Kilpatrick Townsend & Stockton LLP

(57) ABSTRACT

Embodiments relate to methods and systems for gathering, archiving, transmitting, and processing forensic and latent fingerprints. An integrated forensic fingerprint scanning system is provided that includes a number of features for use with forensic-quality fingerprinting. One set of features of embodiments of the portable forensic fingerprint scanning system provides real-time feedback for accurate fingerprinting and training, including visual and/or audio feedback. Another set of features provides cadence-based functionality for improving fingerprinting results. Another set of features provides cryptographic-based approaches to secure highly sensitive collected fingerprint information against loss, theft, or surreptitious modification or tampering. Yet another set of features provides latent fingerprint collections and processing. Still another set of features provides various databasing functions, including centralized storage, data sharing, secure networking, etc. And another set of features provides compatibility with a large variety of jurisdiction-specific inputs and/or outputs, including linguistic interactivity, alerts, print cards, etc.

14 Claims, 10 Drawing Sheets

```
                    ← 500

┌─────────────────────────────┐
        │          "SOCP"             │
        │         (32-Bits)           │
        ├─────────────────────────────┤
        │      Date/Time Stamp        │
        │   (32-Bit Universal Time)   │
        ├─────────────────────────────┤
        │       Serial Number         │
        │         (32-Bits)           │
        ├─────────────────────────────┤
        │      Software Version       │
        │         (32-Bits)           │
        ├─────────────────────────────┤
        │      Code Group Count       │
        │         (32-Bits)           │
        ├─────────────────────────────┤
        │     IV-Vector (128-Bits)    │
        │   CFB Initialization Vector │
        ├─────────────────────────────┤
        │        Session Key          │
        │        (256-Bits)           │
        ├─────────────────────────────┤
        │  Message Authentication Key │
        │        (256-Bits)           │
        ├─────────────────────────────┤
        │    16-Byte Code Group #1    │
        │        (128-Bits)           │
        └─────────────────────────────┘
                     .
                     .
        ┌─────────────────────────────┐
        │    16-Byte Code Group #n    │
        │        (128-Bits)           │
        ├─────────────────────────────┤
        │   Msg Authentication Code   │
        │        (256-Bits)           │
        └─────────────────────────────┘
```

FIG. 5

FINGERPRINT SCANNING SYSTEMS AND METHODS

CROSS REFERENCES TO RELATED APPLICATIONS

This application is a divisional of U.S. patent application Ser. No. 12/580,072, filed on Oct. 15, 2009, entitled "FINGERPRINT SCANNING SYSTEMS AND METHODS". The above-listed application is hereby incorporated by reference in its entirety for all purposes.

FIELD

The present invention relates to fingerprint scanning in general and, in particular, to portable forensic and latent fingerprint scanning, archiving, and transmission systems and methods.

BACKGROUND

For over one hundred years, governments and law enforcement agencies have used fingerprinting to identify individuals. Typically, forensic fingerprinting has involved taking a physical print of the ridges of an individual's skin surface using ink and paper cards. The paper cards can then be archived for comparison to other fingerprints (e.g., latent prints collected at a crime scene).

In recent years, the number of individuals being forensically fingerprinted has quickly grown. One reason for this trend has been a focus on global counter-terrorism and increased world-wide immigration, which has given rise to massive global people-tracking databases. Another reason has been a move by many industries to begin keeping forensic quality prints of their members. For example, forensic fingerprinting has begun to be required by groups within brokerage industries, legal services industries (e.g., lawyers), education industries (e.g., teachers), banking industries (e.g., bank employees), mortgage industries, etc.

In the context of this quickly growing demand for forensic fingerprinting, traditional ink and paper processes are becoming cumbersome and inefficient. As such, there has been a shift toward digital fingerprinting and archival. For example, paper cards are being scanned, or fingerprints are being collected by scanners, and the data is being digitally stored for archival and processing. Stored data may then be used by systems, like automated fingerprint identification systems (AFIS), to assist with background checks, law enforcement, etc.

Digital fingerprinting systems in the art may typically be limited in a number of ways. For example, it may be difficult with many typical systems to reliably and consistently acquire forensic quality fingerprint data. Further, portable systems may typically be limited in their processing, communication, and archival capabilities. Even further, many typical systems may be difficult to use. As such, it may be desirable to provide a forensic fingerprinting system that addresses these limitations in the art.

BRIEF SUMMARY

Embodiments of the present invention provide systems and methods for gathering and processing forensic and latent fingerprints. An integrated forensic fingerprint scanning system is provided that includes a number of features for use with forensic-quality fingerprinting. One set of features of embodiments of the portable forensic fingerprint scanning system provides real-time feedback for accurate fingerprinting and training, including visual and/or audio feedback. Another set of features provides cadence-based functionality for improving fingerprinting results. Another set of features provides cryptographic-based approaches to secure highly sensitive collected fingerprint information against loss, theft, or surreptitious modification or tampering. Yet another set of features provides latent fingerprint collection and processing. Still another set of features provides various databasing functions, including centralized storage, data sharing, secure networking, etc. And another set of features provides compatibility with a large variety of jurisdiction-specific inputs and/or outputs, including linguistic interactivity, alerts, print cards, etc.

In one set of embodiments, a method is provided for handling forensic-quality fingerprinting data. The method includes receiving, at a forensic fingerprinting system, an instruction from a user indicating commencement of a scan routine; outputting, from the forensic fingerprinting system, an audiovisual pre-scan cadence to the user indicating a cadence speed; commencing collection of forensic-quality fingerprint data from a subject finger using the forensic fingerprinting system in response to the instruction and substantially upon completion of the audiovisual pre-scan cadence; outputting, from the forensic fingerprinting system, an audiovisual scan cadence to the user indicating the cadence speed during collection of the forensic-quality fingerprint data; and generating representative data as a function of the forensic-quality fingerprint data substantially in real-time as the forensic-quality fingerprint data is collected; and displaying the representative data using the forensic fingerprinting system substantially in real-time as the forensic-quality fingerprint data is collected.

In another set of embodiments, a forensic fingerprinting device is provided. The device includes a fingerprint scanning module configured to collect forensic-quality fingerprint data; a processing module, communicatively coupled with the fingerprint scanning module, and configured to: receive an instruction from a user indicating commencement of a scan routine; output an audiovisual pre-scan cadence to the user indicating a cadence speed; direct the fingerprint scanning module to commence a fingerprint scan substantially upon completion of the audiovisual pre-scan cadence; output an audiovisual scan cadence to the user indicating the cadence speed during the fingerprint scan; and generate representative data as a function of the forensic-quality fingerprint data substantially in real-time as the forensic-quality fingerprint data is collected by the fingerprint scanning module; and a display module, communicatively coupled with the processing module, and configured to display the representative data substantially in real-time as the forensic-quality fingerprint data is collected by the fingerprint scanning module.

In another set of embodiments, a method is provided for handling forensic-quality fingerprinting data. The method includes receiving a passcode provided by a user; verifying the passcode to determine whether the user is an authorized user; and when the user is an authorized user, generating a decryption key, and using the decryption key to decrypt at least some of an encrypted set of fingerprint template vector files and at least some of an encrypted set of subject records, without decrypting an encrypted set of fingerprint image records, wherein: each of the set of fingerprint image records comprises image data representing at least one fingerprint of a subject; each of the set of fingerprint template vector files is associated with an encrypted fingerprint image record and is generated as a function of the associated encrypted fingerprint image record to at least partially characterize image data of the associated encrypted fingerprint image record; and each of the set of subject records is associated with an encrypted fingerprint image record and comprises data characterizing the subject of the associated encrypted fingerprint image record.

In another set of embodiments, a forensic fingerprinting device is provided. The device includes a data store, configured to store: an encrypted set of fingerprint image records, each fingerprint image record comprising image data representing at least one fingerprint of a subject; an encrypted set of fingerprint template vector files, each fingerprint vector file associated with a fingerprint image record and generated as a function of the associated fingerprint image record to at least partially characterize image data of the associated fingerprint image record; and a set of subject records, each subject record associated with a fingerprint image record and comprising data characterizing the subject of the associated fingerprint image record; and a processing module, communicatively coupled with the storage module, and configured to: receive a passcode provided by a user; verify the passcode to determine whether the user is an authorized user; and when the user is an authorized user: generate a decryption key; use the decryption key to decrypt at least some of the encrypted set of fingerprint template vector files and at least some of the encrypted set of subject records, without decrypting the encrypted set of fingerprint image records.

In another set of embodiments, a method is provided for handling forensic-quality fingerprinting data. The method includes receiving an instruction from a user at a forensic fingerprinting system to commence a help session, the forensic fingerprinting system comprising a fingerprint scanning module configured to collect fingerprint data; providing a communication channel between the user and a remote support provider, the communication channel being configured to effectuate two-way voice communications between the user and the remote support provider; collecting fingerprint data from a full-rolled fingerprinting of a subject finger being performed by the user using the fingerprint scanning module; communicating, to the remote support provider over the communication channel, visual image data representative of the fingerprint data substantially in real-time as the fingerprint data is collected using the fingerprint scanning module; and receiving voice feedback from the remote support provider over the communication channel relating to collecting the fingerprint data from the full-rolled fingerprinting of the subject finger performed by the user using the fingerprint scanning module.

In another set of embodiments, a forensic fingerprinting device is provided. The device includes a user interface module, configured to receive an instruction from a user to commence a help session; a fingerprint scanning module configured to collect fingerprint data from a full-rolled fingerprinting of a subject finger performed by the user; and a communications module, communicatively coupled with the fingerprint scanning module, and configured to: establish a communication channel between the user and a remote support provider in response to the instruction received via the user interface module, the communication channel being configured to effectuate two-way voice communications between the user and the remote support provider; communicate, to the remote support provider over the communication channel, image data representative of the fingerprint data substantially in real-time as the fingerprint data is collected using the fingerprint scanning module; and receive voice feedback from the remote support provider over the communication channel relating to collecting the fingerprint data from the full-rolled fingerprinting of the subject finger performed by the user using the fingerprint scanning module.

In another set of embodiments, a forensic fingerprinting system is provided. The system includes a communications network; a support provider in communication with the communications network; a forensic fingerprinting device, comprising: a user interface module, configured to receive an instruction from a user to commence a help session; a fingerprint scanning module configured to collect fingerprint data from a full-rolled fingerprinting of a subject finger performed by the user; and a communications module, communicatively coupled with the fingerprint scanning module, and configured to: establish a communication channel over the communications network between the user and the support provider in response to the instruction received via the user interface module, the communication channel being configured to effectuate two-way voice communications between the user and the support provider over the communications network; communicate, to the support provider over the communication channel, image data representative of the fingerprint data substantially in real-time as the fingerprint data is collected using the fingerprint scanning module; and receive voice feedback from the support provider over the communication channel relating to collecting the fingerprint data from the full-rolled fingerprinting of the subject finger performed by the user using the fingerprint scanning module.

In another set of embodiments, a method is provided for handling forensic-quality fingerprinting data. The method includes connecting to a network from a first forensic fingerprinting device, the first forensic fingerprinting device being associated with a trusted group and comprising a data store, the data store having stored securely thereon a first set of fingerprint records; detecting, using the first forensic fingerprinting device, presence of a second forensic fingerprinting device on the communications network, the second forensic fingerprinting device having stored securely thereon a second set of fingerprint records; determining that the second forensic fingerprinting device is associated with the trusted group; substantially upon determining that the second forensic fingerprinting device is associated with the trusted group: establishing a secure bidirectional communication channel between the first forensic fingerprinting device and the second forensic fingerprinting device over the communications network; and synchronizing the first set of fingerprint records and the second set of fingerprint records via the secure bidirectional communication channel.

In another set of embodiments, a forensic fingerprinting system is provided. The system includes a communications network; a first forensic fingerprinting device in communication with the communications network and comprising a data store, the data store having stored securely thereon a first set of fingerprint records; a second forensic fingerprinting device in communication with the communications network, associated with a trusted group, and comprising: a data store having stored securely thereon a second set of fingerprint records; and a synchronization module configured to: detect the presence of the first forensic fingerprinting device on the communications network; determine that the first forensic fingerprinting device is associated with the trusted group; and substantially upon determining that the first forensic fingerprinting device is associated with the trusted group, synchronize the first set of fingerprint records and the second set of fingerprint records via a secure bidirectional communication channel established between the first forensic fingerprinting device and the second forensic fingerprinting device over the communications network.

In another set of embodiments, a method is provided for handling forensic-quality fingerprinting data. The method includes scanning a subject finger using a fingerprint scanning module to collect a set of fingerprint image data, the set of fingerprint image data comprising a set of pixel values; generating a seed of a predetermined bit-length as a function of the set of pixel values; generating a pseudo-random stream of bits as a function of the seed; and encrypting fingerprint records stored on a forensic fingerprinting system using keys derived from the pseudo-random stream of bits.

These and other embodiments and features are described below with reference to the description below.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label (e.g., a lower-case letter) to denote one of multiple similar components. When reference is made to a reference numeral without specification of a sub-label, the reference is intended to refer to all such multiple similar components.

FIG. 5 shows an embodiment of an enciphered data item layout for use with various embodiments of an FICP.

DETAILED DESCRIPTION

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Figure 1:
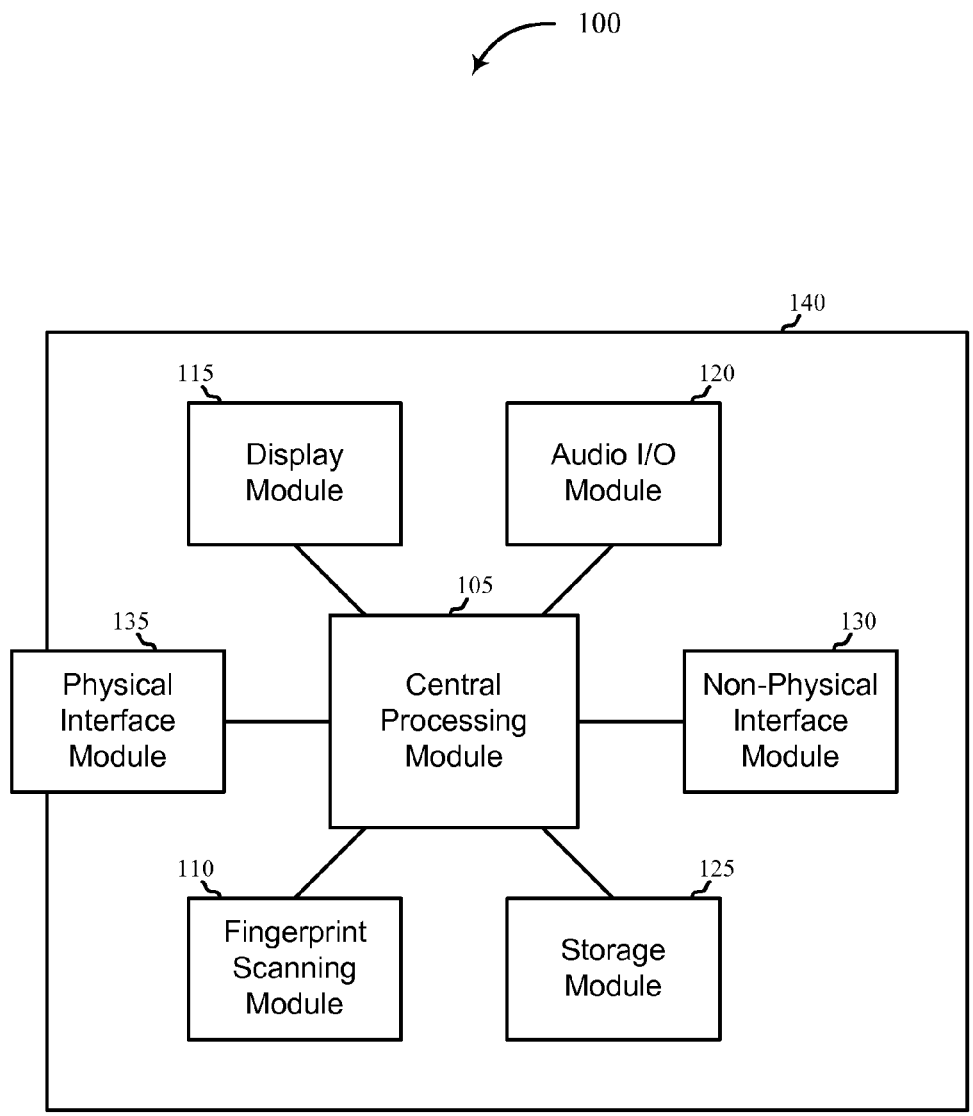
FIG. 1 shows a system for forensic fingerprinting, according to various embodiments.

Turning first to FIG. 1, a system is shown for forensic fingerprinting, according to various embodiments. The system 100 includes a central processing module 105 in communication with a fingerprint scanning module 110, a display module 115, an audio input/output module 120, a storage module 125, a non-physical interface module 130, and a physical interface module 135. In some embodiments the various component modules of the system 100 are housed within a housing 140 that is configured to be portable, as described more fully below.

In some embodiments, the system 100 is a portable forensic fingerprint scanning system. The fingerprint scanning module 110 is configured to take forensic quality fingerprints. It is worth noting that, as used herein, "forensic fingerprints" and similar phraseology are intended to be construed according to the types of fingerprints known to those in the forensic arts as certified for forensic identification. Forensic quality prints may be differentiated, for example, from so-called "biometric" prints, which may typically collect only the data needed to identify an individual with a certain minimum level of certainty (e.g., for use with an electronic lock). In some cases, these types of forensic quality prints may be defined according to local rules and regulations, for example, as prints that have legal evidentiary standing in a particular jurisdiction. Embodiments of the system 100 are configured to provide forensic fingerprinting data that is certifiable for use with automated fingerprint identification systems (AFIS) and other law enforcement systems.

Typically, the fingerprint scanning module 110 includes a transparent glass (or other material) platen and a number of optical, ultrasound, or electronic components such as electrical field sensors, polymer thin film transistor devices, thermal sensors, capacitive devices, or similar components. For example, a volar surface of a finger may be placed in contact with, and rolled across, the platen. During the roll on an optics-based embodiment, optics irradiate (e.g., shine visible or non-visible light on) the skin surface, and receive optical information. The optical information may include reflected and/or refracted light from the finger, or other types of optical information. The various optical components may include radiation sources (e.g., one or more light sources configured to generate one or more frequencies, polarities, intensities, etc. of light), lenses, mirrors, prisms, filters, etc. In certain optics-based embodiments, the fingerprint scanning module 110 includes a charge-coupled device (CCD) or other components to generate a digital output signal as a function of the optical information received from the scanned surface.

In some embodiments, the fingerprint scanning module 110 is specifically configured as a fingerprint scanner. In certain embodiments, for example, the platen, optics, and/or other components are specifically designed to maximize the information collected from a forensic fingerprint scan. In other embodiments, the fingerprint scanning module 110 is not specifically configured as a fingerprint scanner, and is, instead, any useable scanning device of sufficient resolution and other specifications to record a forensic quality fingerprint. Certain embodiments of the fingerprint scanning module 110 are sized to record single forensic fingerprints at a time. For example, the scanning platen is substantially sufficient in size to allow a large finger to be rolled across from edge of nail to opposite edge of nail. Other embodiments of the fingerprint scanning module 110 are configured to record other types of prints, like a non-rolled "slap" print, a whole hand or palm print, a foot print, a latent print, etc.

As used herein, a "slap print" refers to certain types of prints typically taken by law enforcement agencies for use with AFIS systems. For example, a typical AFIS system may be configured to store a right slap (i.e., the four fingers of the right hand other than the right thumb), a left slap (i.e., the four fingers of the left hand other than the left thumb), two thumb slaps (i.e., the right thumb and the left thumb), and ten rolled prints (i.e., a rolled print of each of the ten fingers). The fingerprint scanning module 110 (e.g., or the system 100) may be configured to provide data that satisfies the fourteen AFIS prints.

Further, as used herein, "latent fingerprints" are intended to broadly include any type of fingerprint that is retrievable from an environment, in contrast to a fingerprint taken "live" from an individual in a controlled environment. For example, latent prints may include accidental impressions left by friction ridge skin on a surface. The impressions may be visible or invisible when deposited on the surface. For example, the latent print impressions may include so-called "patent prints" left by residues from natural secretions (e.g., secretions of the eccrine glands, sweat, blood, etc.), grease or motor oil, ink or paint, dirt, etc., or so-called "plastic prints" left by making an actual physical impression into a surface (e.g., in clay, wax, putty, grease, etc.).

Depending on the type of latent print, information may be retrieved in different ways. For example, latent prints may be collected using tape, photographs, or many other known processes. In some embodiments, the fingerprint scanning module 110 is configured to read information collected using one or more of these processes. For example, the fingerprint scanning module 110 may be configured as an optical scanner that can read fingerprint information from a photograph or piece of laminate (e.g., tape), in addition to (or instead of) reading information from a live subject finger.

In some embodiments, the fingerprint scanning module 110 includes multiple scanners. For example, in one embodiment, the housing 140 includes a single print scanning platen and a slap print scanning platen. In another embodiment, "left" and "right" scanning areas are provided to facilitate parallel scanning of subject fingers (e.g., a right and left thumb at the same time) and/or to facilitate different orientations of use of the system 100. In still another embodiment, the fingerprint scanning module 110 is integrated with the display module 115. For example, during scanning, a region of the display module 115 is configured to gather scan data at the fingerprint scanning module 110. And in another embodiment, the fingerprint scanning module 110 includes one or more external scanners (e.g., latent fingerprinting modules, lower-resolution modules for non-forensic prints, etc.). For example, these external modules may be in communication with the system 100 via the non-physical interface module 130 and/or the physical interface module 135, as described below.

It will be appreciated that, in many cases, latent prints may be incomplete (e.g., may include only a portion of a volar surface of a finger) and/or distorted (e.g., smudged, skewed, overlapping, on a textured surface, etc.). As such, it may be necessary to perform additional post processing on the latent fingerprint data to achieve useful results. This type of post processing may be performed, in some embodiments, by the central processing module 105.

In various embodiments, the central processing module 105 receives some or all of the data generated by the fingerprint scanning module 110 for use in generating useful output data. In certain embodiments, the output data is simply a file of the raw scan data from the fingerprint scanning module 110. In other embodiments, the output data is a useful digital representation of the scan data. For example, where the scanner generates analog signals from optical, capacitive, or other types of sensing components, the central processing module 105 may convert those data into a useful format (e.g., a particular digital data file structure). In still other embodiments, the central processing module 105 performs complex processing functions. For example, the central processing module 105 may implement various image processing algorithms to identify useful data from the fingerprints, such as identifying macro-level patterns (e.g., arches, loops, and whorls), minutia features (e.g., long ridges, short ridges ("dots"), bifurcations, ridge endings, pores and pore configurations), and/or other features (e.g., tattoos, stains, cuts, etc.). Other processing functions of the central processing module 105 will be described further below.

It is worth noting that the quality of data received from a forensic fingerprint scan may depend on certain factors, including the proper placement of the subject finger (e.g., the volar skin surface of the finger or set of fingers), the speed of the roll, characteristics of the subject finger (e.g., whether the skin surface is too dry), etc. In certain embodiments, the display module 115 is configured to assist with scanning performed using the fingerprint scanning module 110.

In some embodiments, the display module 115 provides substantially real-time feedback from the fingerprint scanning module 110. For example, as a finger is being rolled across the platen of the fingerprint scanning module 110, the display module 115 may display the scan data (e.g., or a representation of the scan data). This may provide the operator with a number of types of useful data.

In one embodiment, the real-time display data includes crosshairs configured to assist the operator of the system 100 with proper placement of the subject finger. For example, it may be necessary to place a thumb in a different location of the fingerprint scanning module 110 than another finger, due to a difference in the location of desired ridge information from the skin surface.

In another embodiment, the real-time display data on the display module 115 is configured to assist the operator with finding where to begin the "roll." With a slap print or a flat print, the subject finger is placed on the fingerprint scanning module 110 (e.g., on the platen) and a scan is performed. With a rolled print, the finger is rolled across the fingerprint scanning module 110 from fingernail edge to the opposite nail edge. As such, it may be critical to find the proper starting location of the roll, in order to acquire all the desired fingerprint data.

In yet another embodiment, the real-time data shown on the display module 115 is configured to assist the operator with determining whether the scanned data is sufficient for its desired purpose. For example, when a skin surface is too dry, it may be difficult in some cases to acquire sufficient scan data. The operator may use a lotion, or other product, to achieve improved scan results. The real-time feedback from the scan may allow the operator to see, substantially immediately, that the subject finger should be rescanned.

In some embodiments, the display module 115 (e.g., or another component of the system 100, like the audio input/output module 120) may be used to inform the operator of the need to rescan the subject finger. For example, the central processing module 105 may process the scanned data from the fingerprint scanning module 110, and output a message or other indication to the operator representing whether the scan revealed sufficient data. In one embodiment, the scan data is compared by the central processing module 105 to data from other scans (e.g., taken by the system 100 and stored in the storage module 125, or otherwise accessible by the system 100) to determine whether a positive identification can be made based on the data acquired.

In other embodiments, the system 100 is in communication with other systems, for example, substantially in real-time. In one embodiment, the system 100 is in communication with a training or support system, through which a training or support specialist can view substantially what is being viewed by the operator. For example, the operator may be having trouble getting sufficient fingerprinting data and may contact a support center. A fingerprinting specialist may be able to effectively watch the scan as it is being performed, for example, through substantially synchronized display capabilities, and make suggestions (e.g., to apply lotion to the subject finger, to change the subject finger location on the fingerprint scanning module 110, etc.).

In still other embodiments, the display module 115 is configured to display a virtual print card. This may be used by the operator to keep track of which prints are still needed from a detainee or other individual. Certain embodiments are compatible with a variety of major standard or custom fingerprint cards, including, for example, FBI FD-258 and FD-259 cards, cards for foreign agencies (e.g., MI-5/UK, INTERPOL, MOI/Saudi Arabia, etc.), and U.S. state cards (e.g., North Dakota print card, State of Washington Sex Offender card, etc.), Child identification cards, etc.

In yet other embodiments, the display module 115 is configured to provide additional functionality through use of a touch screen. In one embodiment, the touch screen interfaces between a user and graphical user interface (GUI) elements. For example, the GUI may provide access to various functions through virtual windows, menus, keypads, buttons, sliders, etc. Further, the touch screen interface may provide certain advanced interfacing capabilities, such as recognition of "gestures," interactions involving multiple fingers at once, temperature sensing, capacitive sensing, proximity sensing, tool interactivity (e.g., interactivity with a stylus), etc.

It will be appreciated that the display module 115 may be configured to display any useful type of information. For example, on-board training routines may be included, which are displayed and/or interacted with through the display module 115. Further, it will be appreciated that the display module may be sized or otherwise configured according to various types of design specifications. For example, the display may be configured according to ease of viewing, optimizing battery life, optimizing cost, etc.

In some embodiments, in addition to interacting with the system 100 through the display module 115, interactivity is provided through the audio input/output module 120. Embodiments of the audio input/output module 120 include audio output components (e.g., one or more speakers), audio input components (e.g., one or more microphones), and/or audio processing components (e.g., the audio input/output module 120 and/or the central processing module 105 may implement one or more audio codecs, voice recognition algorithms, audio filters, etc.). Some or all of the components of the audio input/output module 120 may be integrated within the housing 140 or may interface with the system 100 via the non-physical interface module 130 and/or the physical interface module 135.

Some embodiments of the audio input/output module 120 provide audio input functionality. In one embodiment, voice commands may be used to control some or all of the functions of the system 100. For example, voice commands, such as "start scan," "zoom," "enhance," "upload to network," "call for support," etc. may be used. In another embodiment, the storage module 125 is configured to store voice memos recorded through the audio input/output module 120. For example, a crime scene investigator can record his own observations and those of people at the scene, in addition to gathering fingerprint data.

Other embodiments of the audio input/output module 120 provide audio output functionality. In one embodiment, audio cadencing is supported, as described more fully below. For example, when performing a scan, the audio input/output module 120 may output a cadence sequence, like "three . . . two . . . one . . . start scan . . . one . . . two . . . three . . . stop scan." It will be appreciated that the cadence may improve the reliability of the scan data taken through the fingerprint scanning module 110 in some cases. In certain embodiments, the cadencing may be synchronized with certain display elements via the display module 115. For example, the audio cadence may be reinforced with a line that sweeps a display area over a certain time interval. In another example, an indicator may change color to represent to the user whether the scan is proceeding too quickly or too slowly.

In various embodiments, the cadencing and/or other assistive functionality may be provided at one or more levels. For example, there may be an advanced user setting with no cadencing or other guidance, and a "novice" user setting that includes audio and visual cadencing and additional guidance (e.g., "now align the center of the detainee's right thumb print with the crosshairs on the display . . . now roll the thumb all the way to either side . . . now say 'start scan'"). In other embodiments, the audio output may be used to support other functions, such as voice communications, or audio representations of what is on the display module 115 (e.g., for ease of use, to extend battery life where the display is not required, to support use by people with certain disabilities, etc.).

In certain embodiments, the audio input/output module 120 and/or the display module 115 may be configured to support various alert functions. In one embodiment, the display includes an indication (e.g., substantially real-time) of a current terrorism threat level (e.g., Department of Homeland Security "orange") or lost child "Amber Alerts." For example, the indication may be in a designated location on the display, part of a screen saver function, accessible via a menu or touchscreen soft key, etc. In another embodiment, in order to help protect law enforcement personnel, users can define a "Code Green" capability to automatically silently alert that a newly scanned fingerprint matches a previously recorded (e.g., scanned) print, but with different supporting information (e.g., the stated name, address, etc. does not match).

In certain embodiments, the audio input/output module 120 and/or the display module 115 may be configured to support various jurisdiction-specific functions. For example, some embodiments support jurisdiction-specific print cards. Some embodiments also support jurisdiction-specific user interfacing. For example, one embodiment supports nine natural languages, in audio interactivity through the audio input/output module 120, in display interactivity through the display module 115, etc. Other embodiments also support jurisdiction-specific communication protocols. For example, certain agencies may use certain cryptographic protocols (e.g., NIST-certified protocols, etc.), certain geographic regions may use certain telecommunications protocols (e.g., WiFi, GSM, CDMA, etc.), etc. Embodiments of the system 100 may detect a location of the system (e.g., as a function of a user login, an IP address lookup, a global positioning system (GPS) receiver, etc.), and auto-configured elements (e.g., language, print card selection, etc.) according to the geographic location.

Embodiments of the system 100 further include the storage module 125 for handling certain storage functions. For example, fingerprint data collected by the fingerprint scanning module 110, collected by other components in communication with the system 100 (e.g., an external scanner, another system in the field, etc.), or stored at other storage locations accessible by the system 100 (e.g., a networked server or other location) can be stored at the storage module 125. In certain embodiments, the data is stored in a format conducive to being quickly and reliably retrieved and/or searched. For example, embodiments may use flat file databases, hash tables, etc. Embodiments of the storage module 125 are configured to store the data securely, for example, using one or more forms of encryption.

Embodiments of the system 100 also include interface modules, including the non-physical interface module 130 and/or the physical interface module 135. The non-physical interface module 130 may be configured to provide non-physical interfaces with external components. For example, the non-physical interface module 130 may support Bluetooth®, WiFi, infrared, wireless, cellular, or any other type of non-physical interface for peripherals or other components not integrated within the housing 140. The physical interface module 135 may provide one or more standard or custom physical interfaces, like ports. For example, the physical interface module 135 may include one or more universal serial bus (USB) ports, serial ports, parallel ports, card slots, etc. It will be appreciated that many different types of external components may be used with (or as part of) the system 100 via one or more of the non-physical interface module 130 or physical interface module 135 interfaces. For example, the system 100 may be configured to support a variety of USB-enabled devices, including an external "Flap-Slap" fingerprint scanner, a full-palm fingerprint scanner, a fingerprint card printer, a mugshot digital camera, a keyfob storage device, a writable optical card drive, an automatic backup system, a microphone, a monitor, a user interface device (e.g., a foot pedal, mouse, keyboard, stylus, etc.), a power supply, an external audio headset with boom microphone, etc.

It will be appreciated that, depending on the configuration of the system 100, any of the modules or components described above may be integrated or in communication with each other in various ways. For example, some embodiments are configured so that all components are integrated within the housing 140. Other embodiments are configured to maximize the number of components that can be interfaced with the housing 140, for example, to optimize weight and battery life. Any of these or other configurations are possible without departing from the scope of embodiments.

Figure 2:
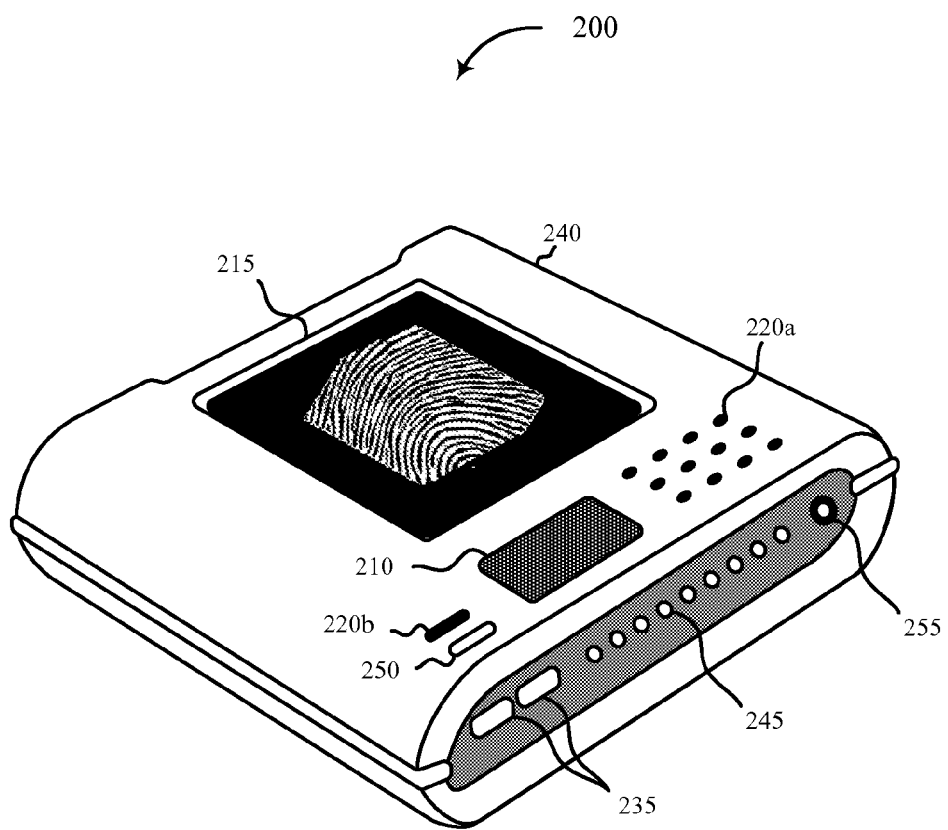
FIG. 2 shows an illustrative embodiment of a portable system, like the system of FIG. 1, according to various embodiments.

FIG. 2 shows an illustrative embodiment of a system 200, like the system 100 of FIG. 1, according to various embodiments. The system 200 includes some of the components described above with reference to FIG. 1. It will be appreciated that the system 200 is intended to be illustrative of one possible embodiment of a portable forensic fingerprinting system and is shown only from one viewing direction. As such, only some features of the system are illustrated, for the sake of clarity, and the absence of other features should not be construed as limiting the scope of the embodiments in any way.

As shown, the system 200 is integrated within a housing 240, configured to provide a display area 215, an audio input/output area 220, a fingerprint scanning area 210, a physical interface area 235, and other features. In one embodiment, the housing 240 is a hardened National Electrical Manufacturers Association (NEMA) style, injection-molded, dark-grey, water-resistant case. The housing 240 may also include bright yellow, soft rubber edges, gasketry, and other features. It will be appreciated that these and other features may be included for enhanced portability, use in harsh environments, visibility in low light conditions, etc.

In some embodiments, the display area 215 provides access to the display portion of a display module, like the display module 115 of FIG. 1. The display area 215 may be slightly recessed in the housing 240, for example, to reduce scratching, reduce glare, etc. In one embodiment, the display provided in the display area 215 is a 8.4-inch (diagonal), open-frame, color, liquid crystal display (LCD) touchscreen (e.g., Optrex T-55466). The touchscreen may have a resolution of 800×600 pixels, support 262,000 display colors, a 500-to-1 contrast ratio, a 230 cd/m2 luminance, an LVDS input signal, a viewing angle (T/D/L/R) of 35/65/60/60, a minimum backlight life of 60,000 hours, an operating temperature of zero to fifty degrees Celsius, and a power rating of 2 W at 3.2 VDC.

In certain embodiments, display module components are in communication with additional display elements. As shown in FIG. 2, the housing 240 may include one or more indicators 250. For example, the indicators may include light emitting diodes (LEDs), auxiliary screens, liquid crystal display panels, etc. It will be appreciated that these indicators may be used to supplement or supplant many of the display functions described above.

In some embodiments, the audio input/output area 220 provides access to a speaker, microphone, and/or other components of an audio input/output module, like the audio input/output module 120 of FIG. 1. The audio input/output area 220 includes a speaker 220a and a microphone 220b. In one embodiment, the audio input/output area 220 includes a large, water-resistant, integral speaker/microphone, configured to provide some or all of the functionality described above (e.g., audio prompting, VoIP operation, etc.).

In some embodiments, the fingerprint scanning area 210 provides access to components of a fingerprint scanning module, like the fingerprint scanning module 110 of FIG. 1. The fingerprint scanning area 210 includes a surface configured to receive scan data, for example, a platen. As described, many different types of scanners are possible, according to various embodiments. For example, some embodiments include one or more of an FBI-certified, full-rolled, forensic-quality "digID" scanner from Identification International Inc. (13), a palm/full-rolled "XPLite" scanner from Smiths-Heimann/Crossmatch, a full-rolled "ACCO" scanner from Smiths-Heimann/Crossmatch, a BMF flat/slap scanner, etc. As described above, one or more scanners may also be interfaced with the housing 240, for example, through physical or non-physical ports. In some embodiments, the fingerprint scanning area 210 (e.g., and components of the fingerprint scanning module 110 of FIG. 1) are used for biometric registration and/or identification of authorized operators, system administrators, etc.

In some embodiments, the physical interface area 235 provides access to components of a physical interface module, like the physical interface module 135 of FIG. 1. The physical interface area 235 includes one or more interface locations (e.g., ports) in the housing 240. As shown, two USB ports are provided as the physical interface area 235 in the housing 240. In one embodiment, four USB ports and one Ethernet port are provided.

In certain embodiments, one or more power ports 255 are provided. The power port 255 may be configured to interface with a power adapter (e.g., a converter configured to plug into a main lines voltage outlet in a building, a cigarette lighter outlet in an automobile, or a solar panel). Embodiments of the housing 240 may include a housing structure for supporting a battery (not shown). For example, a rechargeable Nickle Metal Hydride battery may be provided to allow remote field operation without needing an external power source. The battery may or may not be replaceable. It will be appreciated that the power port 255 may be designed to integrate with the battery in a number of ways. For example, when the power port 255 is in use, the battery may be bypassed or recharged.

Some embodiments of the housing include additional features. For example, as described above, some embodiments of the housing 240 are configured to be portable and rugged (e.g., lightweight, shock-proof, water-resistant, easy to clean, etc.). Also, as described above, embodiments of the housing 240 may include ergonomic features (e.g., grip locations and/or materials), aesthetic features, and/or functional features to support components of the system 200. For example, embodiments of the housing 240 include vent holes 245 for reducing heat build-up. In one embodiment, the system 200 is configured to operate quietly with limited internal fans (not shown) under computer control (e.g., controlled by an integrated processor as a function of current ambient and/or core temperatures), and supported by the vent holes 245.

Further, in some embodiments, the housing 240 is configured to be physically secured to a location. For example, the underside of the housing 240 may include a securement system for securing the housing 240 (e.g., and/or any cables or peripherals) to a desk, a table, a pole, a custom mount, etc. This may enhance repeated or continued operation of the system 200 over a period of time in a particular location (e.g., an office, a field site, a police car, etc.).

Certain embodiments of the housing 240 further include features to aid in complying with types of certification. For example, the inside of the housing 240 may be sprayed with a special metallic liquid compound to substantially eliminate radio-frequency radiation from some or all of the housing (e.g., there may be portions of the housing configured to include transceiving functionality) to help with FCC certification processes. Some embodiments include an additional case to house the housing. The case may include various features, such as windows or ventilation holes, for exposing the display, scanner, etc.

Embodiments of the housing 240 are configured to house and/or interface with various other components of the system 200. Components of the system 200 may be implemented in a number of ways, according to various embodiments. In some embodiments, components of the system 200 are implemented, in whole or in part, in hardware. They may include one or more Application Specific Integrated Circuits (ASICs) adapted to perform a subset of the applicable functions in hardware. Alternatively, the functions may be performed by one or more other processing units, on one or more integrated circuits. In other embodiments, other types of integrated circuits may be used (e.g., Structured/Platform ASICs, Field Programmable Gate Arrays and other Semi-Custom ICs), which may be programmed. Each may also be implemented, in whole or in part, with instructions embodied in a computer-readable medium, formatted to be executed by one or more general or application specific controllers.

Figure 3A:
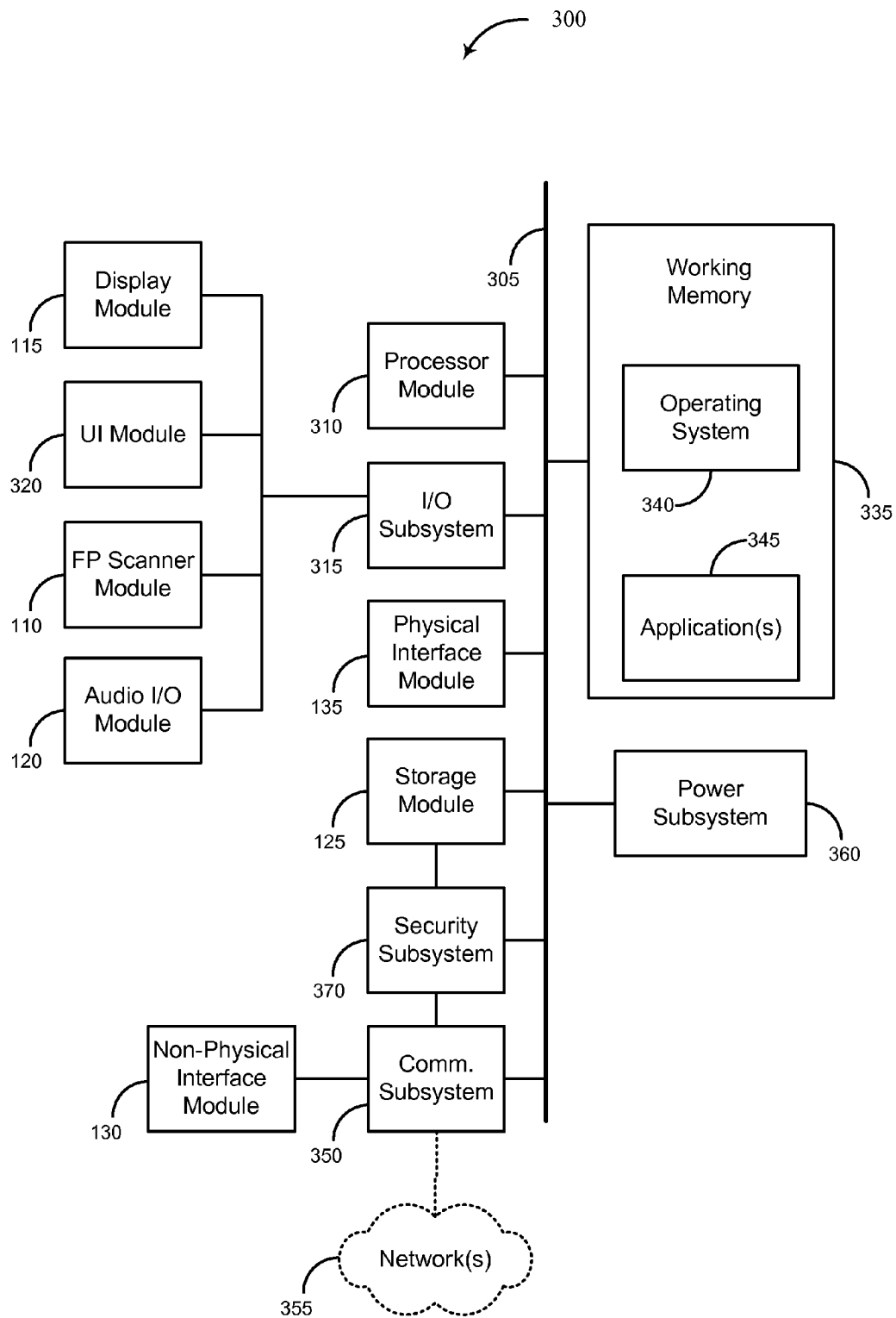
FIG. 3A shows a block diagram of a computational system for implementing a forensic fingerprinting system, like the system of FIG. 1, according to various embodiments.

FIG. 3A shows a block diagram of a computational system 300 for implementing a forensic fingerprinting system, like the system 100 of FIG. 1, according to various embodiments. The computational system 300 is shown having hardware elements that may be electrically coupled via a bus 305 (or may otherwise be in communication, as appropriate). The hardware elements may include one or more processor modules 310, including without limitation one or more general-purpose processors and/or one or more special-purpose processors (such as digital signal processing chips, graphics acceleration chips, and/or the like). In various embodiments, the processor module 310 implements some or all of the functionality of the central processing module 105 of FIG. 1.

The processor module 310 (e.g., in conjunction with other components, as described below) may be configured to perform certain system-level functions. In one embodiment, automatic integral hardware watchdog timers are implemented, for example, to guard against software lockups. In another embodiment, automatic reboot of the system may be implemented, for example, to stabilize long-term operation. Heuristic determinations may also be used to determine appropriate reboot times based around learned use patterns. In yet another embodiment, the processor module 310 is configured so that there are substantially no system startup and/or shutdown procedures.

Embodiments of the computational system 300 include various integrated component modules for interfacing with a user. Some functionality of these components may be handled (e.g., integrated) through an input/output subsystem 315. For example, the input and/or output components may include a fingerprint scanning module 110 (e.g., like the fingerprint scanning module 110 of FIG. 1), a display module 115 (e.g., like the display module 115 of FIG. 1), an audio input/output module 120 (e.g., like the audio input/output module 120 of FIG. 1), a user interface module 320 (e.g., for handling GUI elements), etc.

Embodiments of the computational system 300 may further include a physical interface module 135 and/or a non-physical interface module 130 for handling interfacing functions. For example, the physical interface module 135 and/or non-physical interface module 130 may route data to and/or from one or more physical or non-physical interface ports, process (e.g., decode, parse, filter, translate, etc.) traffic, etc. In certain embodiments, the non-physical interface module 130 is in communication with a communication subsystem 350.

The communication subsystem 350 may be configured to handle wired and/or wireless communications. For example, the communication subsystem 350 may handle communications with one or more networks 355 (e.g., the Internet, a local area network (LAN), a proprietary secure network, etc.), peripheral devices, or other systems being used in a certain area. Embodiments of the communications subsystem 350 may include a modem, a network card (wireless or wired), an infra-red communication device, a wireless communication device and/or chipset (such as a Bluetooth® device, an 802.11 device, a WiMAX device, cellular communication facilities, etc.), and/or the like. In certain embodiments, the communication subsystem 350 communicates with one or more networks 355 through a physical interface port (e.g., a USB or Ethernet connection provided through the physical interface module 135).

Embodiments of the network(s) 355 may include any type of network familiar to those skilled in the art that can support data communications using any of a variety of commercially-available (and/or free or proprietary) protocols, including without limitation TCP/IP, SNA, IPX, AppleTalk, X.25, and the like. Merely by way of example, the network 355 can be a local area network (LAN) (e.g., an Ethernet network, a Token-Ring network, etc.), a wide-area network (WAN), a virtual network (e.g., a virtual private network (VPN)), the Internet, an intranet, an extranet, a public switched telephone network (PSTN), an optical (e.g., infrared) network, a wireless network (e.g., operating under any of the IEEE 802.11 suite of protocols, the Bluetooth® protocol, and/or any other wireless protocol), and/or any combination of these and/or other networks.

The computational system 300 may further include (and/or be in communication with) a storage module 125, which can include, without limitation, local and/or network accessible storage and/or can include, without limitation, a disk drive, a drive array, an optical storage or optical card device, a solid-state storage device such as a random access memory (RAM), and/or a read-only memory (ROM), which can be programmable, flash-updateable, and/or the like. Various embodiments of the storage module 125 provide volatile and/or non-volatile storage, working memory, archival storage, automatic back-up functionality, etc. In certain embodiments, the storage module 125 is configured to interface with (e.g., communicate with, recognize, etc.) external storage. For example, the storage module 125 may be configured to back up data to an external drive whenever the drive is in communication with the computational system 300, or the storage module 125 may be configured to show expanded storage when a USB thumb drive is attached through the physical interface module 135.

In some embodiments, the computational system 300 includes a security subsystem 370, configured to handle various types of data and/or network security. The security subsystem 370 may be in communication with the storage module 125 and/or the communications subsystem 350 either directly, through the bus 305, or otherwise. Some embodiments of the security subsystem 370 employ various cryptographic/security techniques for protecting collected, stored, and/or communicated fingerprint information. In certain embodiments, no cryptographic keys are stored within the computational system 300. One embodiment implements three defined cryptographic levels. According to a first level, each computational system 300 has a unique key pair implemented with a token so that the cryptographic mechanism is transparent to the user. According to a second level, a password is provided by the user to enable the cryptographic system. According to a third level, a passphrase is provided by the user to enable the cryptographic system (e.g., through a one-way hash function).

Of course, various other data protections are provided according to some embodiments. In certain embodiments, a centralized (e.g., networked) server provides storage of fingerprint files with the ability for recovery by remote users. Each remote user may be provided with a unique secret key to secure the data stored at the centralized server. Communications with the centralized server (e.g., and/or any other location) may also be strongly enciphered with NIST-Certified cryptographic algorithms, or other techniques. In some cases, cryptographic functions and/or other functionality of the computational system 300 are certified. For example, in certain embodiments, the communication subsystem 350 is configured to communicate with (e.g., transmit print information to) the FBI, state agencies, INTERPOL, etc. in agreed and/or required electronic formats. These and/or other communications may be certified by government certifications (e.g., FBI, INTERPOL, state-level, etc.), cryptographic certifications (e.g., NIST FIPS 140-1, up to NIST 140-4), etc.

For example, many embodiments of the computational system 300 collect, manage, and transmit very sensitive information that must be securely protected against unauthorized use or modification according to federal and state laws and regulations. Additionally, even more stringent regulations may apply when the computational system 300 is used in certain overseas locations such as in Europe/EU. The protected information may include full-rolled and single/four-finger flat-slap fingerprint and palm images and associated calculated vector templates; collected latent fingerprint images; written signatures; addresses; social security numbers; employment information; scars, marks, and tattoos; physical characteristics (age, race, sex, etc); DOB/birth place; nationality; criminal charges; arrest date; driver license numbers; bases for law enforcement officer caution; detainee photographs; etc., all of which may be highly sensitive and/or confidential.

In certain embodiments, the security subsystem 370 is configured to implement a novel "Fingerprint Information Cryptographic Protocol" (FICP) to be a cryptographic "protocol." Embodiments of the FICP may be coded in the programming language, Common Lisp, that specifies the exact sequence of computer algorithmic and other steps that secure the protected information during collection, archiving, and transmission. For example, while the security subsystem 370 is shown as a separate module in communication with the bus 305, the FICP may, in fact, be implemented in whole or in part as an application 345 residing in working memory 335 (e.g., as described below), or otherwise, as appropriate. The FICP may be designed, in particular, to secure all protected data from unauthorized access in the event that a system including the computational system 300 is lost, stolen, or otherwise compromised.

Transfer of protected information may happen between embodiments of the computational system 300 and a user, between embodiments of the computational system 300 and a government operated fingerprint repository (e.g., an AFIS at the Colorado Bureau of Investigation (CBI), the Federal Bureau of Investigation (FBI), etc.), between two separate computational systems 300 (e.g., via a local area network (LAN) or wide-area network (WAN)), between embodiments of the computational system 300 and a remote private (e.g., non-government controlled) server that stores fingerprints and/or related information, etc. All of these types of transfers may be secured by the FICP.

In one embodiment, the FICP design parameters include: securing the protected information to a level not penetrable except by the most sophisticated attacks typically available only to a few national intelligence and law enforcement agencies; depending only on long-bit digital secret keys for base security with no dependence on software complexity or obscurity; employing only base cryptographic computer algorithms that have been certified by the National Institute of Standards and Technology ("NIST") as secure to the "Top Secret" level; providing protection for a period of at least 25-years of anticipated/extrapolated improvements in mathematics (e.g., that yield improved integer factoring algorithms), general cryptographic technologies, and hardware speedups; and being as invisible to the user as practical with limited hindrance to use. Of course, other embodiments may include some or all of these and/or other design parameters.

One embodiment of the FICP is described in detail below with reference to specific modules, programming features, etc. The specifics of the description of the embodiment are intended only to be enabling to one of skill in the art and to clarify at least one embodiment of the FICP. Those of skill in the art will appreciate certain alternate embodiments still within the scope of the inventions, and, as such, the description should not be construed as limiting the scope of the invention. The embodiments of the FICP are implemented to include the following interacting modules: "Cryptographic Keys," a "Gestalt File," and a "Source of Cryptographically Secure Pseudo-Random Numbers." Each will be discussed in turn.

A first of the interacting modules is the "Cryptographic Keys." Generally, embodiments of the computational system 300 reside in a network in which they are in communication with each other over one or more sub-networks (e.g., all machines owned by a particular law enforcement agency). The computational systems 300 may share collected fingerprint information with each other in some embodiments, and each computational system 300 may also be in communication with a central server (e.g., known by a static IP address) to backup and share fingerprint information and/or to download system software updates. This type of networking functionality will be discussed in more detail below with reference to FIG. 7.

The networking may be facilitated in a secure way by the security subsystem 370. A network of public and private cryptographic keys may be used to secure the protected information as a function of individual "mother keys" and "public/private key pairs." For example, each computational system 300 is associated with (e.g., has stored thereon) a secret 256-bit symmetric encryption key, known as the "Mother Key" (denoted "$K_{Mother}$"), that is used to encipher/decipher all information internal to that system, such as global setup parameters, collected fingerprint and related information, etc., and to control system access. In certain embodiments, to guard against reverse engineering, $K_{Mother}$ is never stored inside the system is when powered down but, rather, is generated on-the-fly at power-up hashing a touchscreen entered pass phrase and/or other non-varying data (e.g., separate cryptographic token, GPS coordinates within a certain proscribed limited radius, etc.). If the hash, used as a deciphering key, successfully decrypts the global setup parameters to yield known valid plaintext, then it is used as $K_{Mother}$. When the system is operating with a valid $K_{Mother}$, the key may be protected inside a Common Lisp functional closure so as to not be directly accessible to the user. When $K_{Mother}$ is no longer needed, it may be zeroized in a cryptographically secure way so that reverse engineering of a stolen or compromised machine (e.g., reading the latent remnants of memory) will yield minimal information after power-down followed by surreptitious power-up.

Further, each computational system 300 may contain a unique 2048-bit secret/public key pair (denoted "$K_{Public}/K_{Private}$") that is used to communicate with other computational systems 300 and/or with a central server using standard public key cryptographic techniques. Each computational system 300 may have a unique serial number (denoted "S/N"), which may be tied to its public key. Thus, the central server may be able to securely communicate with each computational system 300 by referring to an associative list of serial numbers and public keys, and each computational system 300 may be able to securely communicate with other allowable computational systems 300, using its own sub-list, as well as with the central server. For example, secure TCP/IP traffic amongst computational systems 300 and/or with the central server may consist of records that include the S/N of the originating machine as plaintext appended with cipher text enciphered with the private key of the originating machine (along with a record serial number, message authentication code, etc. designed to prevent various cryptanalytic attack methods).

A second of the interacting modules is the "Gestalt File," a top-level file (e.g., "Gestalt.soi") that contains the current state of all of the system configuration parameters that are remembered between power-down/power-up cycles. In certain embodiments, over one hundred parameters are stored in the Gestalt File such as S/N of the machine; name, location, country/time-zone, and natural language of the user; exact hardware configuration; fingerprint cards that the particular machine is configured to understand and print; IP address of any state/national AFIS system that the machine can communicate with; IP address of the central server; serial numbers/public keys of associated computational systems 300; the $K_{Public}/K_{Private}$ cryptographic key pair for the computational system 300; etc. The Gestalt File may be enciphered on a flash disk (e.g., in the storage module 125) with $K_{Mother}$ for the particular computational system 300. At system start-up, the user may be asked to touch-type a pass phrase on the touchscreen, which may be hashed and used as a candidate $K_{Mother}$ to decipher the Gestalt File. If the decryption is successful and yields known plaintext, then the hash is used as $K_{Mother}$ to enable the unlocking of all other information contained in the machine. If the decryption fails, then access is denied and all protected information remains secure.

A third of the interacting modules is the "Source of Cryptographically Secure Pseudo-Random Numbers." Fundamentally, the overall security of the FICP may depend on the "quality" of long-bit (128-, 256-, 1024-, and 2048-bit) pseudo-random numbers generated automatically by the system that are used extensively as permanent and session keys, public/private key pairs, initialization vectors, and message authentication code keys. In one embodiment, a "Blum-Blum-Shub" generator is employed that takes the recursive form:

$$X_{k+1} = X_k^2 \bmod M,$$

where k is 0, 1, 2, . . . and where M=pq is the product of two large prime numbers p and q which are both congruent to 3 (mod 4) which guarantees that each quadratic residue has one square root also a quadratic residue and that $\gcd(\phi(p-1), \phi(q-1))$ will be small (where $\phi$ is the Euler totient function from standard number theory) which makes the cycle length of the pseudo-random sequence large. Each cycle of the recursive definition generates a single pseudo-random bit, which is the bit parity of $X_{k+1}$. The FICP may set M to be on the order of 1024-bits in length.

It will be appreciated that the efficacy of the FICP may be related to the quality of the initial seed $X_0$, which may need to be as "random" as practical. Generating a good seed with high entropy in a real system may be difficult. Embodiments of the FICP use inherent noise contained in fingerprint images (e.g., particularly in rocking, full-rolled fingerprint images) to generate that entropy. For example, the 1024-bit initial seed, $X_0$, may be generated at the very first power-up of the computational system 300 by scanning four separate verified full-rolled rocking fingerprint images; hashing the four separate pixel images, as integers, with one-way hash SHA-256; and then appending the resultant 256-bit hashes together to form the single 1024-bit integer S, which will be, with probability on the order of $1-2^{-1024}$, in the interval [1, M−1], which is then modified such that gcd(S, M−1) is 1 and then $X_o$ is calculated as $X_0 = S^2 \bmod M$. If even one bit of the fingerprint images is different, the SHA-256 may cause the overall $X_0$ hash to be radically different, which may cause the $X_{K+1}$ pseudo-random stream to be equally different. One standard crypanalytic technique used to break secure systems that depend on pseudo-random bit streams is to replicate the $X_0$ seed. However, generating the same hash result by attempting to spoof the fingerprint scan device with a copying artificial finger, especially with the required full-rolled rocking scan, may, therefore, have an extremely low probability of success.

In some embodiments, a separate, low-priority software background task runs endlessly to maintain two separate FIFO (first-in, first-out) 10,240-bit (divisible by 128, 256, 1024, and 2048) sets of pseudo-random bits by calculating, as needed, the bit parity of the result of the $X_{k+1}=X_k^2$ mod M calculation followed, in some embodiments, by von Neumann bit de-skewing. When one of the bit-sets has been exhausted, the FICP may retrieve random bits from the other, and the first bit-set may be replenished by the background task. The background-generating task always validates the 10,240-bit set with the NIST-defined random number statistical tests, which if ever fail causes that entire bit-set to be flushed and replaced with a new generated set. At system power-down, the unused bit-set and the current $X_{k+1}$ is written to the Gestalt File which is enciphered with $K_{Mother}$ to be recovered, deciphered, and used at next power-up. For example, a Common Lisp expression may implement the task as follows:

M=pq where p and q are two large primes of length 512-bits both congruent to 3 (mod 4).

S=SHA-256(verified rocked full-rolled 8-bit pixel fingerprint image 1)|| SHA-256(verified rocked full-rolled 8-bit pixel fingerprint image 2)|| SHA-256(verified rocked full-rolled 8-bit pixel fingerprint image 3)|| SHA-256(verified rocked full-rolled 8-bit pixel fingerprint image 4)

S=S (modified so that gcd(S, m−1)=1)

$X_0=S^2$ mod M do forever $X_{k+1}=X_k^2$ mod M next bit of bit set=parity($X_{k+1}$)

run NIST statistical tests on each full bit-set (where "||" is an append operator)

Figure 4:
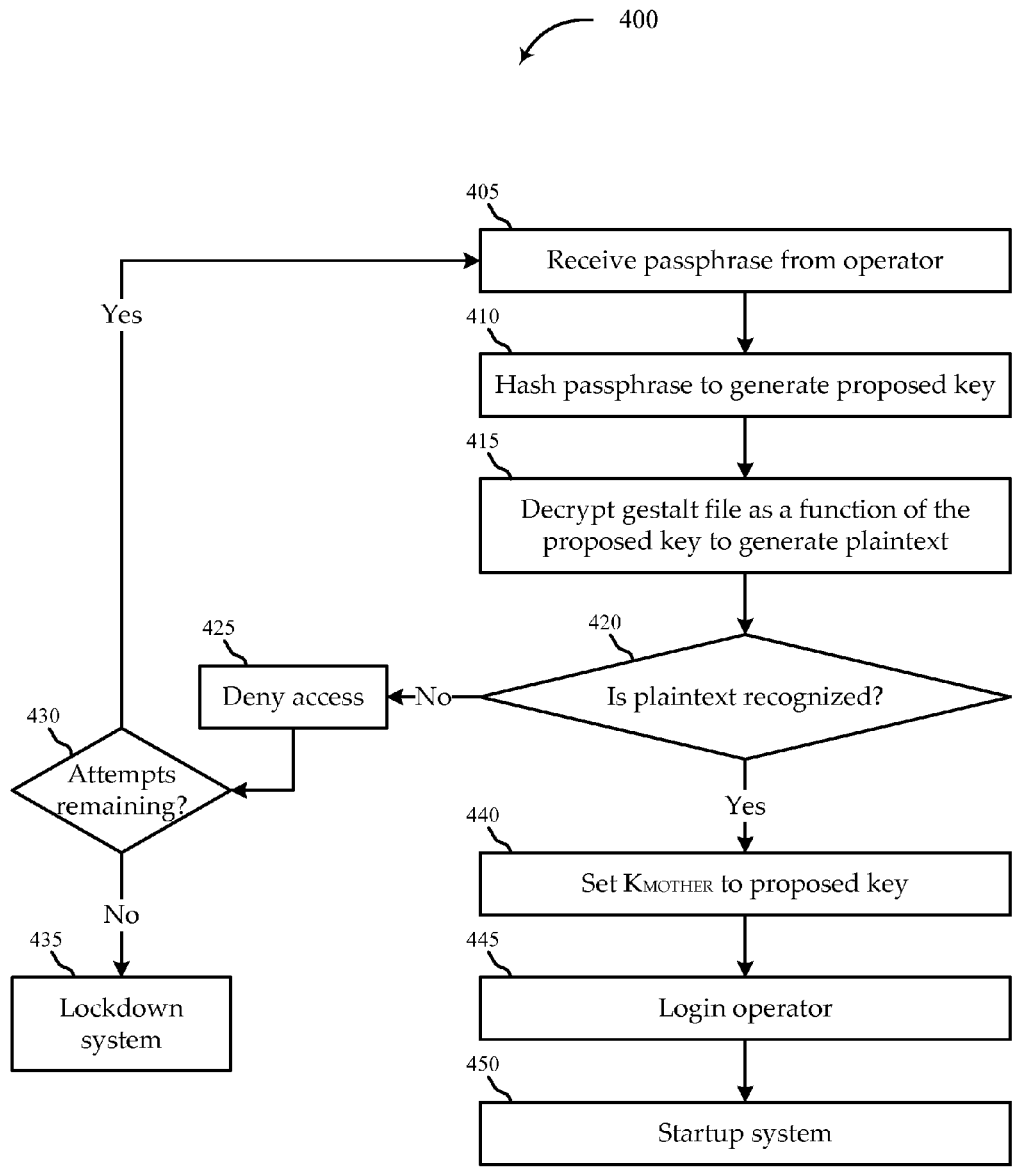
FIG. 4 shows a flow diagram of an illustrative method for using a "Fingerprint Information Cryptographic Protocol" (FICP) at startup, according to various embodiments.

It will be appreciated that the FICP can be implemented and used in a number of ways, according to various embodiments. One use of the FICP is at system start-up and login. FIG. 4 shows a flow diagram of an illustrative method for using the FICP at start-up, according to various embodiments. Each computational system 300 may have its own touch-typed passphrase that is required for system start-up.

The method 400 begins at block 405, by receiving a passphrase that may be entered by the user (e.g., via the touchscreen). At block 410, the passphrase may be SHA-256 hashed to generate a proposed key. The proposed key is then used at block 415 to decrypt the Gestalt File, thereby generating a plaintext output. At block 420, the method 400 determines whether the decipherment is successful (e.g., if plaintext is recognized).

If the decipherment is unsuccessful, the user may be denied access at block 425. In some embodiments, a predetermined number of attempts is allowed (e.g., a user may unsuccessfully attempt to log in only three times in a one-hour period). At block 430, the method 400 determines whether login attempts remain. If not, the system may be locked at block 435. For example, unlocking the system may require waiting some predetermined amount of time (e.g., one hour or twenty-four hours), receiving a different login (e.g., a higher level login provided to higher authorized users, etc.), or requiring service only by authorized service personnel. If login attempts remain, the method 400 may return to block 405 to receive another passphrase attempt.

If the decipherment is determined to be successful at block 420, the proposed key may be used as $K_{Mother}$ at block 440. Additionally, at block 445, the user may be logged in. At block 450, the computational system 300 may start up. Once the computational system 300 has started up and the user is logged in, protected data may be available, as well as other functionality of the computational system 300.

When the user creates or changes the passphrase, the new phrase may be automatically checked for "strength." For example, the phrase may be checked against a dictionary of natural words, proper names, and well-known phrases (e.g., English for systems operating in English; German for systems operating in German, as defined in the Gestalt File). If the proposed passphrase is found in the dictionary, proper name, or phrase lists, the operator is informed of the weakness and urged to use a better pass phrase. Each character in the (English) passphrase may add approximately 1.3-bits of entropic information, and, thus, a 256-bit key may require about 197-characters of English text for full entropy. However, if at least some non-alphanumeric characters are used, especially in non-grammatical ways, along with upper/lower case, and, especially, as non-recognizable words, the number of characters required for full entropy may drop dramatically down to about 46 characters. It will be appreciated that entropy needed for a 128-bit equivalent key, believed secure with today's cryptanalytic technology, may be achieved by only around 23 alphanumeric/punctuation characters. In one embodiment, as the proposed new passphrase is provided (e.g., touched in on the touchscreen), a heuristic grading function, based on the character mix of the phrase, is applied and the results shown graphically to the operator in real-time as a sliding bar (e.g., from 0-100). As mentioned above, an accepted passphrase may be used to generate $K_{Mother}$. The successfully generated $K_{Mother}$ may then be printed to hard-copy, as 64 hexadecimal digits, for storage in a secure location such as a safe deposit box or transmitted back to the central server and enciphered there for system recovery in the event that the passphrase is forgotten.

Another use of the FICP is for secure transfer of information with enciphering symbionts. Secure transfer of protected fingerprint-related information in the storage module 125 (e.g., between main memory and flash disk) and/or via TCP/IP transmission between computational systems 300 and the central server or other computational systems 300 may be handled by "symbionts," defined herein as objects (e.g., in the object-oriented programming context), with methods coded in several embodiments in the Common Lisp/Common Lisp Object System (CLOS) programming environment, that encipher/decipher protected objects strictly according to the FICP protocol.

A Cipher Feedback (CFB) block cipher mode may be used to reduce the probability of success of cryptanalytic plaintext attacks of various types (e.g., without cipher chaining, identical plaintext blocks are enciphered into identical ciphertext blocks). Each enciphered data item to be transferred or transmitted may have an identically structured header that consists of a 32-bit File Header Tag ("SOCP" in ASCII); a 32-bit date/time stamp when the file was written (in Common Lisp Universal Time format); a 32-bit serial number of the producing machine; a 32-bit Software Version/Subversion of the system that created the file; a 32-bit Code Group Count; and a 128-bit IV (Initialization Vector) used to start the CFB process. All of these data items may be implemented as plaintext. Following the plaintext header may be a 256-bit Session Key, $K_{Session}$, used to encipher this particular file (e.g., to reduce the amount of plaintext enciphered with the same key), which may be AES-256 enciphered with either the $K_{Mother}$ for transfer to/from the flash disk or with $E_{Public}$ for TCP/IP transmission to another computational system 300 or to the central server. Following the enciphered $K_{Session}$ may be a 256-bit MAC Key (Message Authentication Code to reduce the possibility of a cryptanalytic attack based on replacement/modification of some portion of the file), which is enciphered with the $K_{Session}$. After the plaintext/enciphered headers may come a series of 16-byte Code Groups followed by the calculated 256-bit MAC (Message Authentication Code) that verifies authenticity of the contents of the file. The CFB block cipher mode may begin with the $K_{Session}$ and continue to the end of the data item. The CFB mode may switch from the $K_{Mother}$ (or from the $K_{Public}$) to the $K_{Session}$ after the $K_{Session}$ field.

For example, one embodiment of an enciphered data item layout 500 is illustrated in FIG. 5. Plaintext of a data item is tranched into 16-byte code groups (128-bits), which are enciphered with AES-256. The last code group is blank padded, if needed, to force that code group to a 16-byte length which can include a carriage return character (CR). Each line of text is delimited with a CR (which does not exist in the Common Lisp strings). Cipher Feedback (CFB) mode is used for the FIOC protocol which transforms a block cipher into a self-synchronizing stream cipher. The result is that known plaintext cryptanalytic attack vulnerabilities are minimized. Changes in the plaintext propagate forever in the ciphertext such that each ciphertext group is dependent on all previous groups. The IV (Initialization Vector) is a dummy block to initialize the process for the first actual code group. There is no need for the IV to be secret, but it is important that an IV is never reused as security would then be significantly degraded. Thus, the IV is always created with pseudo-random numbers from the cryptographically secure random number generator. CFB Cipher Feedback Mode requires only the AES-256 encipherment mode and not the decipher mode and may be described as follows:

$$C(i) := E_{Key}[C(i-1)] \oplus P(i)$$

$$P(i) := E_{Key}[C(i-1)] \oplus C(i)$$

where C(0) is the IV-Vector and i=1, 2, 3, ..., N (Number of Code Groups).

Still another use of the FICP is for cryptographically efficient storage of fingerprint information. Fingerprint pixel images may be fairly large (e.g., on the order of 40-megabytes per complete full-rolled fingerprint set), and a storage layout optimized for efficient encipherment and/or decipherment may be critical for fast response for the user. Each fingerprint set may also consist of a number of fingerprint pixel images (e.g., ten full-rolled single images, a left four-finger flat-slap, a right four-finger flat-slap, and dual thumb slap prints), name, address, aliases, criminal charges, etc. In one embodiment, the FICP protocol stores the fingerprint images as single data files on the flash disk of known constant size that are each enciphered with the $K_{Mother}$ and with file names being twelve-digit random numbers (ASCII) to fully protect the information from observation in the event of an attempt to crypanalytically reverse engineer the system. Other associated information (names, aliases, etc) for all previously collected fingerprint sets may be stored in a single flat file, when the system is powered down, as ASCII text with each name having a pointer to the associated fingerprint image file. The entire file may be enciphered by the security subsystem 370 using $K_{Mother}$.

When the system is powered up, the flat file may be deciphered with $K_{Mother}$, and the records may then be read, in several embodiments, into the Common Lisp run-time environment so that each name and associated data is stored as an object with multiple hash links for fast lookup by last name, first name, state, alias, etc., and with an identifying link to the external still enciphered associated fingerprint set. When a previously collected fingerprint image set is needed, the link is followed and the image set may only then be deciphered with $K_{Mother}$.

Returning to FIG. 3A, the computational system 300 also may include software elements, shown as being currently located within the working memory 335. The working memory 335 may be part of the storage module 125, as described above, or implemented as a separate component. The working memory 335 may be used to implement an operating system 340 and/or other code, such as one or more application programs 345, which may include computer programs of the invention, and/or may be designed to implement methods of the invention and/or configure systems of the invention, as described herein. In some embodiments, application programs 345 (e.g., control software) are written in Common Lisp, for example, to maximize the ability to use certain artificial intelligence techniques. Further, embodiments use a novel object-based symbiont software system that handles the fast lookup of large numbers of previously collected fingerprints stored in the storage module 125.

Merely by way of example, functionality of one or more systems, components, or procedures described herein might be implemented as code and/or instructions executable by the computational system 300 computer. In one embodiment, the computational system 300 performs embodiments of the invention in response to the processor module 310 executing one or more sequences of one or more instructions (which might be incorporated into the operating system 340 and/or other code, such as an application program 345) contained in the working memory 335. Such instructions may be read into the working memory 335 from another machine-readable medium, such as the storage module 125, and executed by the processor module 310. In this way, the computational system 300 can be "configured to," "adapted to," or "operable to" perform any number of such procedures or methods.

It is worth noting that the terms "machine readable medium" and "computer readable medium," as used herein, refer to any medium that participates in providing data that causes a machine to operate in a specific fashion. In an embodiment implemented using the computational system 300, various machine-readable media might be involved in providing instructions/code to the processor module 310 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, or optical or smart cards. Volatile media includes, without limitation, dynamic memory, such as the working memory 335. Transmission media includes coaxial cables, copper wire, and fiber optics, including the wires that comprise the bus 305, as well as the various components of the communication subsystem 350, the physical interface module 135, the non-physical interface module 130, etc. Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, an optical card or any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions, data, and/or code.

Figure 3B:
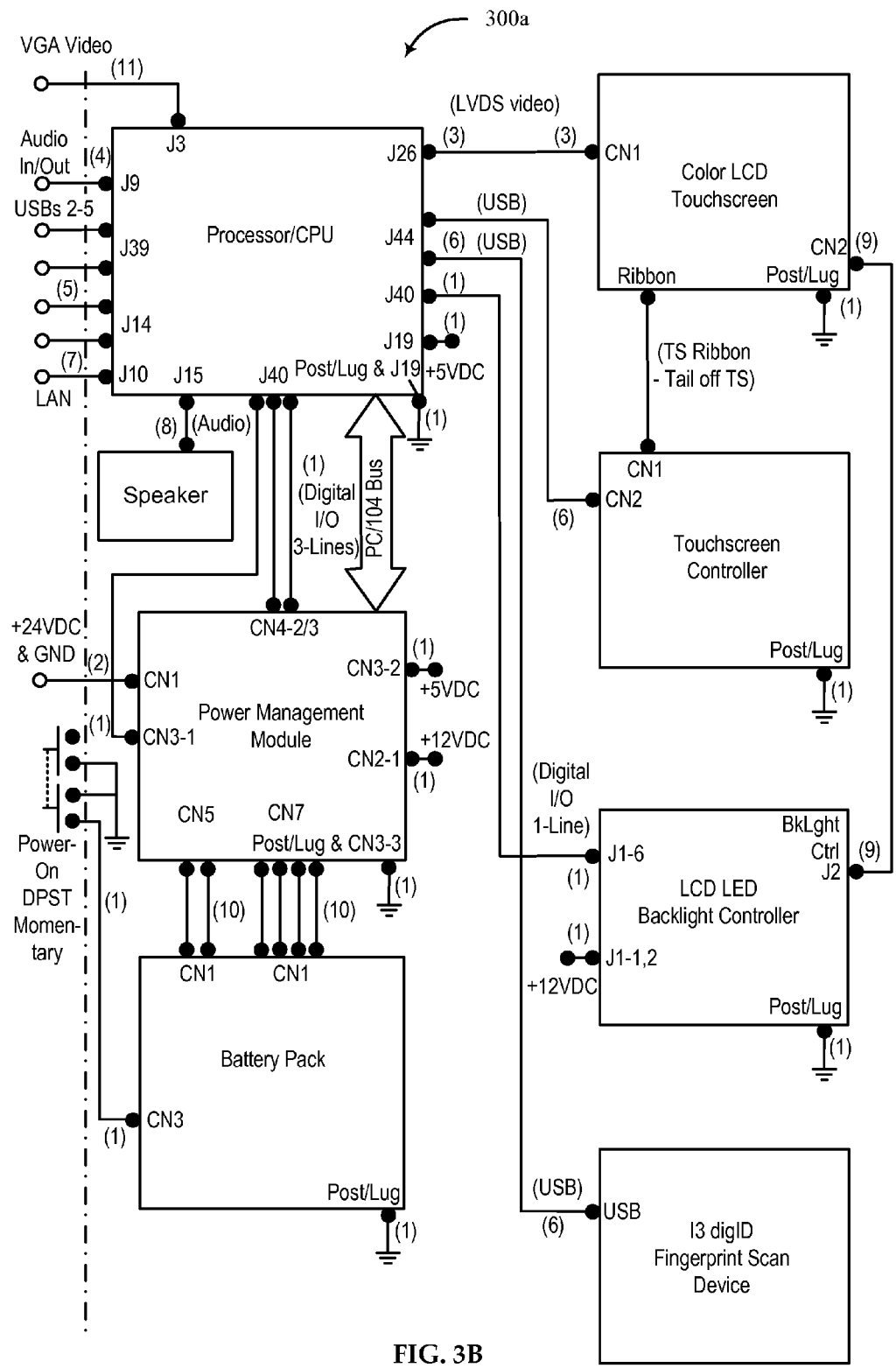
FIG. 3B shows a block diagram of an illustrative embodiment of a hardware architecture of an integrated forensic fingerprint scanning device, like the computational system 300 of FIG. 3A, according to various embodiments.

One illustrative embodiment of a hardware architecture of an integrated forensic fingerprint scanning device 300a is shown in FIG. 3B. The embodiment of FIG. 3B is intended only to show one possible architecture to implement functionality of the computational system 300 of FIG. 3A, and should not be construed as limiting the scope of the invention in any way. As shown, the processor module 310 of the computational system 300 includes a low power (10 W) Intel Pentium ATOM processor running on an industrial process control, single-board computer, designed to operate within extended temperature environments (e.g., −40° C. to +70° C., or −40° F. to +158° F.). The processor module 310 communicates with other components over the bus 305, implemented as a high bandwidth PC/104-PLUS bus. The processor module 310 also software controls a fan (interior to the case) and also drives a blue LED visible to the user (e.g., the indicator 250 of FIG. 2) that indicates, under software control, that the real-time multi-tasking executive control system is functioning via a once per second flashed "heartbeat." A simple test point may be provided within the case for use in system debugging with an oscilloscope (e.g., by examining real-time timing patterns). The electronic boards and components are RoHS (lead free) certified, for example, to allow distribution and use in geographic regions, such as Europe/EU, where that may be required.

The fingerprint scanner module 110 may be implemented using an Identification International, Inc. O3 digID fingerprint scanner in communication with the processor module 310 via a USB path. The display module 115 may be implemented using a large 8.4-inch (diagonal) 800-by-600 pixel, color LCD touchscreen. The audio input/output module 120 may be implemented using a WinSystems PCM-AudioPro audio module that is SoundBlasterPro™-compatible and configured for recording, compression, playback, and other audio capabilities (e.g., with real-time hardware compression and decompression, a sample rate range of approximately 4000 to 44,100 samples per second, and an operating temperature of 0° C. to 70° C.). The physical interface module 135 may include a four-port USB board, also connected via the PC/104-PLUS bus 305, configured to provide four external USB interface ports, one USB channel for the touchscreen in the display module 115, and one USB channel for the fingerprint scan module 110. The USB ports may be implemented as WinSystems PPM-USB2 four channel USB 2.0, providing hot insert/removal support and simultaneous operation of high-bandwidth devices (e.g., handling port speeds of 1.5 Mbps, 12 Mbps, and 480 Mbps; and operating over a range of −40° C. to +85° C.).

The power subsystem 360 may include a special smart power supply/battery charger board (in communication over the PC/104-PLUS bus 305), configured to convert +24 VDC from an external (power brick) source to +5 VDC and +12 VDC regulated power for use by the computational system 300, while also managing charging sequencing for the battery used to power the system when used off the mains. The power subsystem 360 may be implemented using a Tri-M HESC-104HV power supply and battery charger, and on-board power management and smart battery charging features to define battery charging curves as well as control shutdown timing. Various components of the power subsystem 360 provide clean filtered power, load dump and transient protection, battery charging and charge protection functionality, multiple output ratings for different input and output powers (e.g., for use in multiple geographic locations), etc.

It is worth noting that, while various components of the computational system 300 are described according to a certain topology, other topologies are possible according to other embodiments. For example, different components than those shown in FIG. 3A may be connected directly or indirectly to the bus 305. Further, functional blocks are separated out in some cases for the sake of clarity. It will be appreciated by those of skill in the art that various levels of integration are possible. For example, certain functionality of the user interface module 320 may actually be implemented as an application 345 resident in working memory 335 and executed by the processor module 310.

Figure 6:
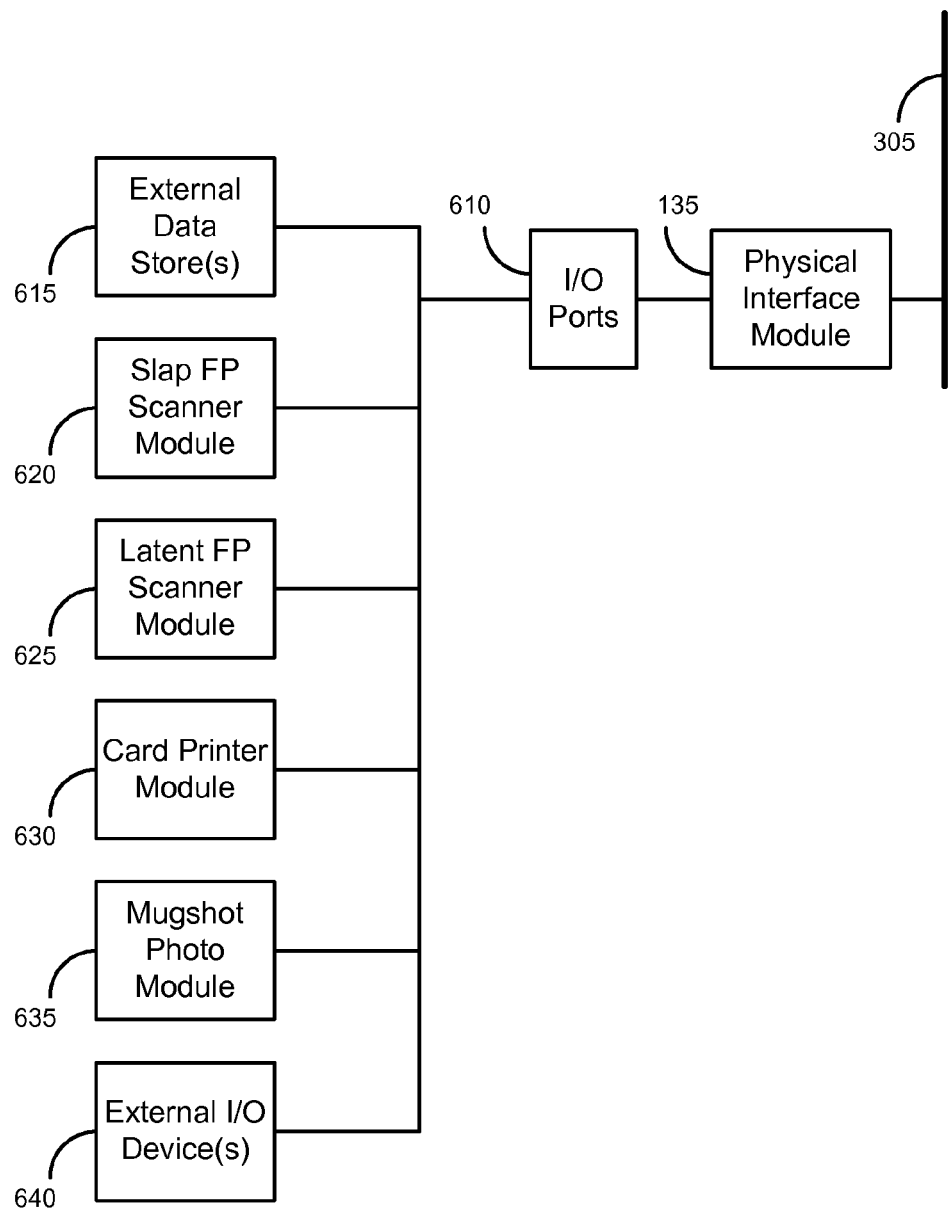
FIG. 6 shows a number of illustrative external components interfacing with the bus of the computational system of FIG. 3A through the physical interface module, according to various embodiments.

Further, as described above, embodiments of the computational system 300 are configured to interface with a variety of external components (e.g., peripherals), for example, through the physical interface module 135 and/or the non-physical interface module 130. FIG. 6 shows a number of illustrative external components interfacing with the bus 305 of the computational system 300 of FIG. 3A through the physical interface module 135, according to various embodiments. As shown, the physical interface module 135 provides functional connectivity between a number of input/output ports 610 and the bus 305.

As described above, the input/output ports 610 may include USB ports, Ethernet ports, wireless ports (e.g., infrared, Bluetooth®, etc.), or any other useful type of ports. In one embodiment, only USB ports are provided and all the peripheral components are compatible with a USB port interface. The embodiment shown in FIG. 6 includes a number of illustrative peripheral components, including one or more external data stores 615, a slap fingerprint scanner module 620, a latent fingerprint scanner module 625, a card printer module 630 (e.g., a dedicated or shared laser or ink jet printer configured to print fingerprint cards), a mugshot photo module 635 (e.g., an external digital camera, configured for mugshot capture with photo information automatically formatted to print on a special mugshot card), and one or more external input/output devices 640 (e.g., a stylus, keyboard, mouse, voice recorder, optical card drive, etc.).

It will be appreciated that being configured to interface with the peripheral components may involve more than just providing the proper port interface. For example, one or more types of hardware or software components (e.g., the applications 345 of FIG. 3A) may be needed in the peripheral component and/or in the system (e.g., the computational system 300 of FIG. 3A) to support use of the peripheral component. For example, as discussed above with reference to the central processing module 105 of FIG. 1, latent prints may often be incomplete and/or distorted. As such, it may be necessary to perform additional post processing on the latent fingerprint data to achieve useful results. Embodiments include embedded artificial intelligence and image processing (e.g., as functionality of the central processing module 105 of FIG. 1 or of the processor module 310 of FIG. 3A) to enable collection of useful fingerprints from samples that may otherwise be difficult or impossible to use. Of course, other systems may exist for post-processing latent scan data. However, it will be appreciated that embedding the functionality according to embodiments may allow real-time feedback and/or other features that are not available from other post-processing options.

In some embodiments, post-processing of latent fingerprint data includes various types of integration with the display. In one embodiment, after the latent fingerprint data is collected and displayed on the display, the operator touches the displayed image, and the system automatically optimizes the display. For example, the system uses image processing techniques to automatically determine an optimum center, zoom, and/or rotation of the print image according to display and/or output (e.g., print card) parameters. In other embodiments, post-processing of latent fingerprint data includes dynamically adjusting one or more filters to maximize a metric value. For example, a series of image processing filters having filter parameters may be applied to the scanned latent fingerprint data to generate an output result. The output result is evaluated to generate a metric value. Filter parameters may be adjusted and image filters re-applied according to one or more algorithms to maximize the metric value. The algorithms may include predefined algorithms, heuristic or neural network-based algorithms, etc. In this way, latent fingerprints may be used to generate fingerprint data that would otherwise be insufficient for use in forensic or similar analyses.

It is worth noting that for various reasons (e.g., to preserve use of the fingerprint data as evidence), image processing techniques may only be applied in certain ways. As such, certain embodiments of the processing algorithms are applied to affect all pixels of the image equally. For example, a fingerprint image may be vastly improved by processing different regions of the print in different ways (e.g., if there is a smudge in one area of the latent print, or a particularly dark area). However, reducing certain distortions for the sake of viewing the image may effectively distort the image for evidentiary purposes. Thus, embodiments may be configured to process the image in one or more ways depending on the intended use (e.g., for enhanced viewing in the field versus for enhanced use as evidentiary record).

Figure 7:
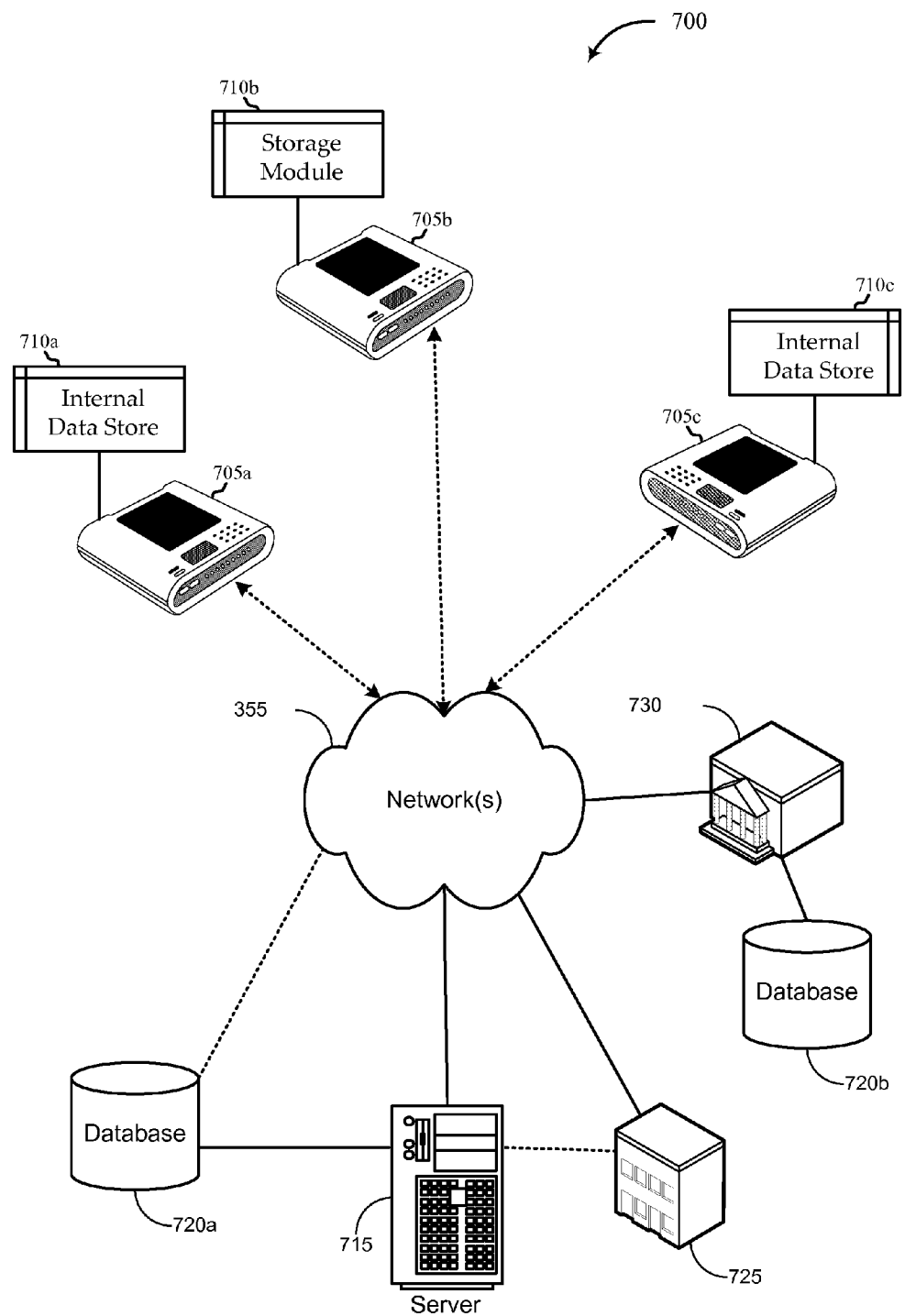
FIG. 7 shows a forensic scanning network 700, according to various embodiments.

While embodiments have been described above in FIGS. 1-6 as single system embodiments, many cases may exist where multiple systems may be used in a single environment (e.g., on a single LAN, at a single crime scene, by a single agency, etc.). For example, FIG. 7 shows a forensic scanning network 700, according to various embodiments. The forensic scanning network 700 includes multiple forensic fingerprinting systems 705, each in communication with one or more entities over one or more communications networks 355. Various types of entities are shown in communication with the forensic fingerprinting systems 705 in certain networked configurations. However, this forensic scanning network 700 topology is intended merely as an illustrative example and should not be construed as limiting (e.g., other network configurations are possible, according to other embodiments).

Embodiments of the forensic fingerprinting systems 705 are shown as having internal storage 710 (e.g., the storage module 125 of FIG. 1). As described above, the internal storage 710 may be used for storage of fingerprint scan data, mugshot data, authorization data, system configuration data, application data, and/or any other useful type of data. Also, as discussed above, some or all of the internal storage 710 may be protected (e.g., encrypted). The forensic fingerprinting systems 705 may also be in communication with one or more communications networks 355, for example, via the communications subsystem 350 of FIG. 3A. Through the communications networks 355, the forensic fingerprinting systems 705 may be in communication with servers 715, databases 720, support facilities 725, forensic facilities 730, other forensic fingerprinting systems 705, Internet locations, etc.

By way of example, the servers 715 might include one or more application servers, which can be configured with one or more applications accessible by a client running on one or more of the forensic fingerprinting systems 705 and/or other servers 715. Merely by way of example, the servers 715 can be one or more general purpose computers capable of executing programs or scripts in response to the forensic fingerprinting systems 705, other computer systems, other servers 715, etc., including without limitation web applications (which might, in some cases, be configured to perform methods provided by various embodiments). Merely by way of example, a web application can be implemented as one or more scripts or programs written in any suitable programming language, such as Common Lisp, Java™, C, C#™ or C++, F#, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on forensic fingerprinting systems 705 and/or other servers 715. In some embodiments, an application server can create web pages dynamically for displaying the information in accordance with various embodiments, such as webpages associated with accounts, or representations of related subjects, records, documents, nodes, node connections, and/or node matches. Data provided by an application server may be formatted as one or more web pages (comprising HTML, Javascript, etc., for example) and/or may be forwarded to a forensic fingerprinting system 705 via a web server (as described above, for example). Similarly, a web server might receive web page requests and/or input data from a forensic fingerprinting system 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement various disclosed methods, incorporated by an application running on a forensic fingerprinting system 705 and/or another server 715. Alternatively, as those skilled in the art will appreciate, a file server can include all necessary files, allowing such an application to be invoked remotely by a forensic fingerprinting system 705 and/or server 715. However, as discussed above, many embodiments include portable forensic fingerprinting systems 705, which may have much of the data (e.g., file and application data) needed to run portably resident on each portable forensic fingerprinting system 705. Further it should be noted that the functions described with respect to various servers 715 herein (e.g., application server, database server, web server, file server, etc.) can be performed by a single server 715 and/or a plurality of specialized servers 715, depending on implementation specifics and parameters.

In certain embodiments, the forensic scanning network 700 includes one or more databases 720. The locations of the databases 720 are discretionary. By way of example, a database 720 might reside on a storage medium local to (and/or resident in) a server 715. Alternatively, a database 720 can be remote from any or all of the other components of the forensic scanning network 700, for example, such that it is accessible via one or more of the communications networks 355. In one set of embodiments, the databases 720 can be relational databases adapted to store, update, and retrieve data in response to SQL-formatted commands. The database might be controlled and/or maintained by a database server, as described above, for example.

In various embodiments, the forensic fingerprinting systems 705 use communications over the communications networks 355, including communications with the servers 715 and/or databases 720, to support different types of functionality. In one exemplary type of communications functionality, embodiments of the forensic scanning network 700 are configured to implement training and/or problem resolution between the user and one or more support facilities 725. In one embodiment, a network connection is established between a forensic fingerprinting system 705 and a support facility 725 over one or more communications networks 355 using cellular telephony, voice-over-Internet-protocol (VoIP)

communications, videoconferencing, etc. For example, the communications may be implemented using components of the display module 115, the audio input/output module 120, and/or the communications subsystem 350 of FIG. 3A.

In another exemplary type of communications functionality, embodiments of the forensic scanning network 700 are configured to allow remote diagnostics (e.g., over the Internet). For example, personnel or automated systems at support facilities 725 may be able to remotely diagnose and/or fix certain problems with forensic fingerprinting systems 705 in real-time by communicating back and forth with headsets and boom microphones over the Internet using VoIP through the 120, 135, and 350 modules. In yet other exemplary types of communications functionality, embodiments of the forensic scanning network 700 are configured to perform automatic (e.g., periodic) back-ups of data to remote storage (e.g., one or more databases 720), receive software support (e.g., application updates) from one or more servers 715, implement core dumps, communicate audit trail/logs to remote support facilities 725 (e.g., for analysis of a software crash event), etc.

In some embodiments, the forensic fingerprinting systems 705 are configured to register (e.g., once, periodically, etc.) with a tracking facility (e.g., one of the support facilities 725). The tracking facility may maintain a database of physical locations and authorized owners for each forensic fingerprinting system 705. The database may include information, such as primary contact information, current software configuration, history of software configurations, maintenance plan in effect, cryptographic key backup, etc. In some cases, the tracking facility may monitor patterns of use of the forensic fingerprinting system 705. For example, usage locations and times, user logins, etc. may be tracked for various reasons.

Embodiments of the forensic scanning network 700 may be further configured to acquire positional data. For example, one or more components of the forensic scanning network 700 (e.g., each of the forensic fingerprinting systems 705) may be in communication with a global positioning satellite (GPS) system, a cellular terrestrial system (e.g., for triangulation), etc. As discussed above, the positioning data may be used in certain embodiments to set location-specific preferences. For example, after detecting the location of forensic fingerprinting systems 705, respective user interface modules (e.g., user interface modules 320 of FIG. 3A) may automatically set the language of user interface elements and format menus to display location-specific information (e.g., locally accepted print card formats); respective communication subsystems (e.g., communication subsystems 350 of FIG. 3A) may set location-related protocols (e.g., network communications protocols, cryptographic protocols, etc.); and cadaver fingerprints collected by first responders at aircraft crash sites or at bio or nuclear/radiological-terror sites may be tagged with GPS coordinates for later analyses.

In some embodiments, the forensic scanning network 700 is configured to support communications with forensic facilities 730. For example, AFIS systems, law enforcement agencies, background check companies, etc. may be in communication with components of the forensic scanning network 700. In certain embodiments, the forensic fingerprinting systems 705 are in communication with some or all of the forensic facilities 730 over one or more communications networks 355. In other embodiments, the forensic fingerprinting systems 705 and forensic facilities 730 are in communication only through one or more intermediaries, for example, one of the support facilities 725.

It will be appreciated that the communications among components of the forensic scanning network 700 may include sensitive data. As described above (e.g., with reference to the security subsystem 370 of FIG. 3A), the communications may be protected through one or more forms of physical or logical security. In some embodiments, sensitive communications are protected according to embodiments of the "Fingerprint Information Cryptographic Protocol" (FICP), as described above.

Embodiments of the forensic scanning network 700 may be used to provide additional types of services, as well. In some embodiments, users of forensic fingerprinting systems 705 subscribe to one or more data services facilitated by the forensic scanning network 700. For example, many types of subscription are possible. One type of service may involve users of the forensic fingerprinting systems 705 not storing any prints at all. Rather, users may collect prints with the forensic fingerprinting systems 705 and print them to electronic or paper print cards, transmit them electronically to a government AFIS system, etc. Another type of service may involve users of the forensic fingerprinting systems 705 not storing any prints on the servers 715 and/or databases 720, but possibly still storing the prints locally on the forensic fingerprinting systems 705.

According to yet another type of service, users store prints on their forensic fingerprinting systems 705, and also share prints with other forensic fingerprinting systems 705 in their trusted group. For example, other forensic fingerprinting systems 705 owned and operated by the same police precinct or government agency, other forensic fingerprinting systems 705 on the same LAN, other forensic fingerprinting systems 705 with trusted login data, other forensic fingerprinting systems 705 communicating with a trusted protocol, etc. may be part of the trusted group. In some embodiments, when a forensic fingerprinting system 705 detects another forensic fingerprinting system 705 from its trusted group, their forensic fingerprinting systems 705 may automatically synchronize their local databases to maintain a synchronized set of fingerprinting data across the trusted group.

According to still another type of service, users may store prints locally, and even share prints among their trusted group, while also storing print data to remote servers 715 and/or databases 720 (e.g., over a communications network 355). In one embodiment, multiple trusted groups are in communication with the same servers 715 and/or databases 720, but data from each trusted group is kept isolated and secure. Similarly, according to even another type of service, the servers 715 and/or databases 720 may maintain storage of fingerprint data from all users in all trusted groups.

As discussed above, these types of server-level services can be used to provide enhanced lookup capabilities, recovery from system crashes or data losses, and other functionality. Additionally, server-level services provide opportunities for a number of different types of subscription services. In one embodiment, users may pay an annual subscription fee for use of the central servers 715 and/or databases 720. In another embodiment, users purchase storage space on the servers 715 and/or databases 720. In yet another embodiment, users pay per service used. For example, users may pay a flat fee for data recovery, monthly data storage, support services, software updates, remote data lookups, etc.

Figure 8A:
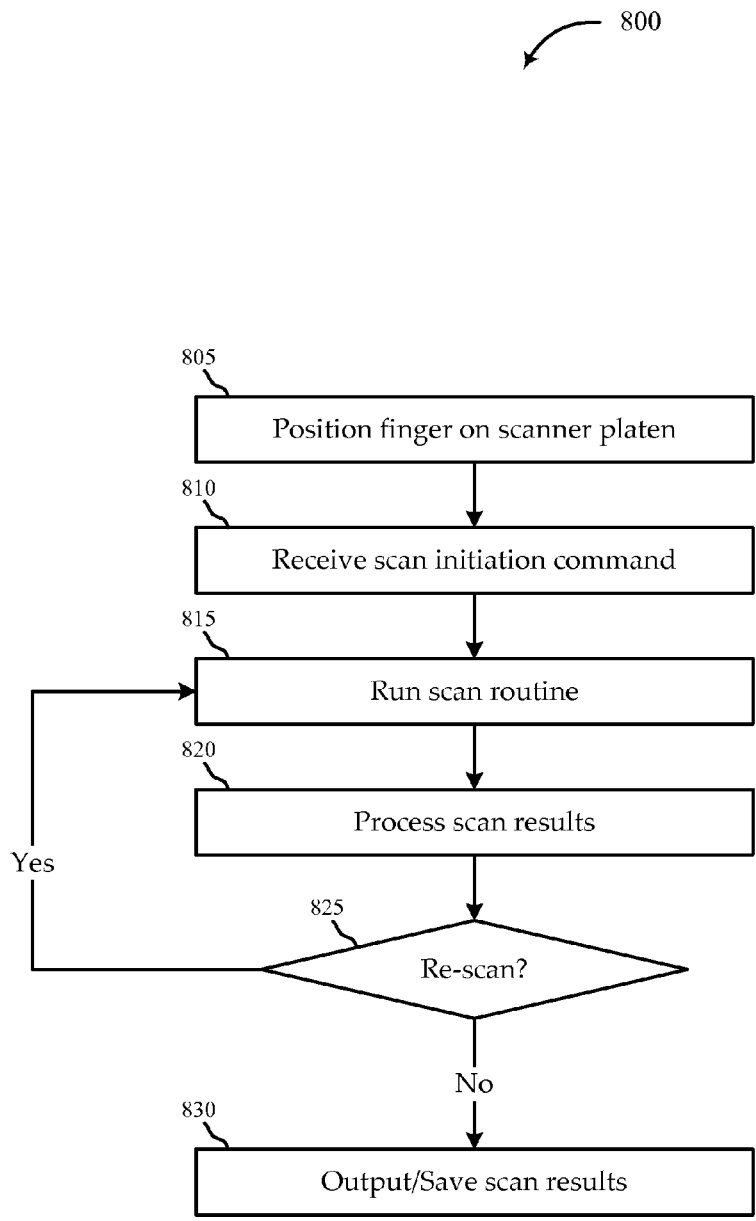
FIG. 8A shows a flow diagram of an embodiment of a method 800 for gathering scan data, according to various embodiments.

Of course, the forensic fingerprinting systems and devices described above (e.g., with reference to FIGS. 1-7) may be used to implement a number of methods, according to various embodiments. FIG. 8A shows a flow diagram of an embodiment of a method 800 for gathering scan data, according to various embodiments. The method 800 begins at block 805 when an operator places a finger (e.g., the finger of a detainee) on a scanner platen of a forensic fingerprinting system (e.g., the forensic fingerprinting system 200 of FIG. 2). The forensic fingerprinting system may then receive a scan initiation command at block 810. For example, the scan initiation command may be received as an interaction with a soft key on the display of the forensic fingerprinting system, as a voice command, etc.

Figure 8B:
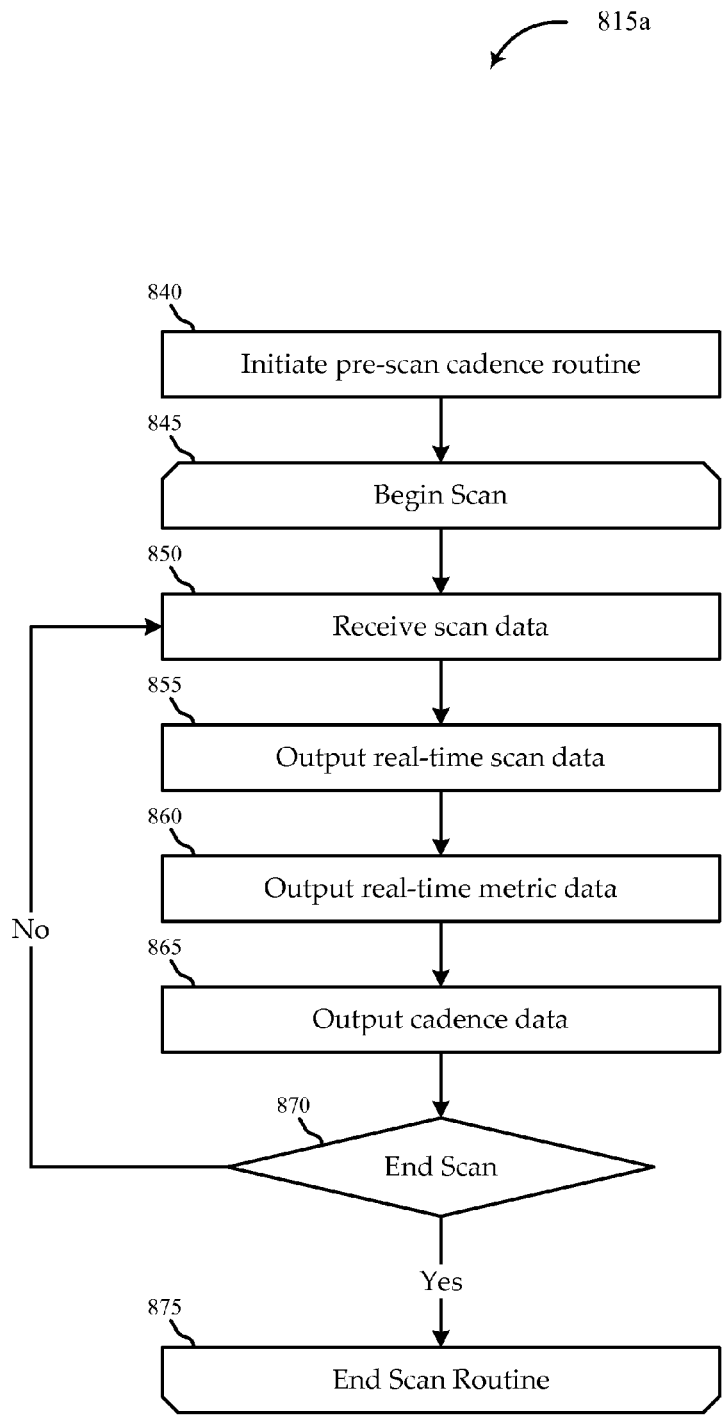
FIG. 8B shows a flow diagram of an embodiment of a scan routine 815a, according to various embodiments.

At block 815, the scan routine may begin to run in response to the scan initiation command. During the scan routine, the scanner of the forensic fingerprinting system may collect fingerprinting data. For example, FIG. 8B shows a flow diagram of an embodiment of a scan routine 815*a*, according to various embodiments. The scan routine 815*a* begins at block 840 by initiating a pre-scan cadence routine. The pre-scan cadence routine may be configured to establish an appropriate cadence for the operator, for example, using an audio prompt (e.g., "three . . . two . . . one . . . start scan"), a blinking LED, a flashing or other visual indicator on the display, etc.

When the pre-scan cadence routine is complete, the scan may begin at block 845. During the scan, a number of steps occur, either serially or in parallel. Data is received at block 850, and the scan data is output (e.g., to the display) substantially in real-time at block 855. In some embodiments, at block 860, metric data is also output substantially in real-time. In one embodiment, an indicator region of the display may change color as the quality of the scan changes. For example, the indicator may be green while the operator is scanning within an appropriate cadence, and may turn yellow or red if the operator's speed changes beyond one or more thresholds. Further, in some embodiments, cadence information may continue to be output during the scan routine at block 865. For example, a vertical line may sweep horizontally across the display at a certain speed as the scan data is being displayed on the display to provide feedback to the operator as to whether the scan speed is sufficiently close to the cadence speed. Audio cadencing may also be used. For example, a pre-scan cadence of "three . . . two . . . one . . . start scan" may transparently flow into a scan cadence of " . . . one . . . two . . . three . . . stop scan."

In some embodiments, during the scan, the scan routine 815*a* monitors whether the scan is complete at block 870. For example, the scan routine 815*a* determines whether a cadence-determine time duration has expired. If the scan is not complete, the blocks of the scan routine (e.g., blocks 850-856) may continue. If the scan is complete, the scan routine may end at block 875.

Returning to FIG. 8A, at block 820, the scan results (e.g., the fingerprinting data obtained during the scan routine of block 815) may be processed. For example, processing the data may include certain image processing or other functions for generating useful fingerprinting data from the raw scan data. The processed data may be analyzed at block 825 to determine whether it is necessary to rescan the data. For example, the determination may be an automated decision based on a certain threshold of data needed for a forensic quality print, based on whether enough data is gathered to find a reliable match with other fingerprint data accessible by the forensic fingerprinting system, based on subjective analysis by the operator, based on an automated GO/NO-GO algorithmic match of the scanned fingerprint with a new scanned simple-flat slap or even another full-rolled print, etc.

When it is determined at block 825 that the scan should be rerun, the method 800 may return to block 815 to reinitiate the scan routine. If it is determined that the scan should not be rerun (e.g., automatically by determining that sufficient data was acquired, manually by receiving an "accept scan," "override," or other command from the operator, etc.), the scan results may be output at block 830. As discussed above, the scan data may be output substantially in real-time during the scan routine at block 815 (e.g., to the display of the forensic fingerprinting system, to support personnel for training or analysis, etc.). However, in some embodiments, once the scan data has been accepted, it may be output as an accepted set of data. For example, outputting the data may include local or remote storage of the data, printing of the data, association of the data with other data about the detainee (e.g., name, address, mugshot photo, etc.), association of the data with descriptive data about the scan (e.g., time stamp, operator ID, GPS location, etc.), association of the data with an official format (e.g., a location on a selected print card, a communications protocol, an encryption protocol, etc.), communication of the data to support and/or forensic entities, etc.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for handling forensic-quality fingerprinting data, the method comprising:
    receiving a passcode provided by a user;
    verifying the passcode to determine whether the user is an authorized user; and
    when the user is an authorized user, generating a decryption key, and using the decryption key to decrypt at least some of an encrypted set of fingerprint template vector files and at least some of an encrypted set of subject records, without decrypting an encrypted set of fingerprint image records, wherein:
        each of the set of fingerprint image records comprises image data representing at least one fingerprint of a subject;

each of the set of fingerprint template vector files is associated with an encrypted fingerprint image record and is generated as a function of the associated encrypted fingerprint image record to at least partially characterize image data of the associated encrypted fingerprint image record; and each of the set of subject records is associated with an encrypted fingerprint image record and comprises data characterizing the subject of the associated encrypted fingerprint image record.

2. The method of claim 1, wherein verifying the passcode to determine whether the user is an authorized user comprises:

generating a proposed key as a function of the passcode;

decrypting a dataset as a function of the proposed key to generate decrypted data, the dataset being configured to reveal predetermined plaintext when decrypted using a correct key;

determining whether the generated decrypted data matches the predetermined plaintext; and when the generated decrypted data matches the predetermined plaintext, determining that the user is an authorized user.

3. The method of claim 2, wherein generating the decryption key comprises:

setting the decryption key to be the proposed key.

4. The method of claim 2, wherein:

generating the proposed key as a function of the passcode comprises hashing the passcode to generate the proposed key.

5. The method of claim 1, further comprising:

receiving a query to determine whether newly received fingerprint data substantially matches one of the set of fingerprint image records;

generating a new fingerprint template vector file as a function of the newly received fingerprint data; and returning a query result as a function of comparing the new fingerprint template vector file against the decrypted set of fingerprint template vector files, without decrypting the encrypted set of fingerprint image records.

6. The method of claim 2, further comprising:

receiving a query from the user comprising an identifier for use in identifying at least one of the encrypted set of fingerprint image records;

locating a result set in response to the query, the result set comprising a subset of the encrypted set of fingerprint image records determined to satisfy the query as a function of the identifier;

decrypting only the subset of the encrypted set of fingerprint image records comprised by the result set to generate a decrypted set of image data; and providing the user with access to the decrypted set of image data in response to receiving the query.

7. The method of claim 1, wherein:

each subject associated with the fingerprint image records is an individual from whom the associated fingerprint image records were collected; and each of the set of subject records comprises personal identifying information characterizing the associated individual.

8. The method of claim 1, wherein the set of encrypted fingerprint image records, the set of encrypted fingerprint template vector files, and the set of subject records are encrypted to be at least as secure as provided by a 256-bit encryption implemented according to the Advanced Encryption Standard.

9. A forensic fingerprinting device comprising:

a data store, configured to store:

an encrypted set of fingerprint image records, each fingerprint image record comprising image data representing at least one fingerprint of a subject;

an encrypted set of fingerprint template vector files, each fingerprint template vector file associated with a fingerprint image record and generated as a function of the associated fingerprint image record to at least partially characterize image data of the associated fingerprint image record; and a set of subject records, each subject record associated with a fingerprint image record and comprising data characterizing the subject of the associated fingerprint image record; and a processing module, communicatively coupled with the storage module, and configured to:

receive a passcode provided by a user;

verify the passcode to determine whether the user is an authorized user; and when the user is an authorized user:

generate a decryption key;

use the decryption key to decrypt at least some of the encrypted set of fingerprint template vector files and at least some of the encrypted set of subject records, without decrypting the encrypted set of fingerprint image records.

10. The forensic fingerprinting device of claim 9, wherein the processing module is configured to verify the passcode to determine whether the user is an authorized user by:

generating a proposed key as a function of the passcode;

decrypting a dataset as a function of the proposed key to generate decrypted data, the dataset being configured to reveal predetermined plaintext when decrypted using a correct key;

determining whether the generated decrypted data matches the predetermined plaintext; and when the generated decrypted data matches the predetermined plaintext, determining that the user is an authorized user.

11. The forensic fingerprinting device of claim 10, wherein generating the decryption key comprises:

setting the decryption key to be the proposed key.

12. The forensic fingerprinting device of claim 9, wherein the processing module is further configured to:

receive a query to determine whether newly received fingerprint data substantially matches one of the set of fingerprint image records;

generate a new fingerprint template vector file as a function of the newly received fingerprint data; and return a query result as a function of comparing the new fingerprint template vector file against the decrypted set of fingerprint template vector files, without decrypting the encrypted set of fingerprint image records.

13. The forensic fingerprinting device of claim 9, wherein the processing module is further configured to:

receive a query from the user comprising an identifier for use in identifying at least one of the encrypted set of fingerprint image records;

locate a result set in response to the query, the result set comprising a subset of the encrypted set of fingerprint image records determined to satisfy the query as a function of the identifier;

decrypt only the subset of the encrypted set of fingerprint image records comprised by the result set to generate a decrypted set of image data; and provide the user with access to the decrypted set of image data in response to receiving the query.

14. The forensic fingerprinting device of claim 9, wherein the data store and the processing module are integrated within a portable housing.

* * * * *